(12) United States Patent
McFarlane et al.

(10) Patent No.: US 8,095,984 B2
(45) Date of Patent: Jan. 10, 2012

(54) SYSTEMS AND METHODS OF ASSOCIATING SECURITY VULNERABILITIES AND ASSETS

(75) Inventors: Bradley Kenneth McFarlane, Ottawa (CA); Douglas Wiemer, Ashton (CA); Kevin McNamee, Ottawa (CA)

(73) Assignee: Alcatel Lucent, Paris (FR)

( * ) Notice: Subject to any disclaimer, the term of this patent is extended or adjusted under 35 U.S.C. 154(b) by 1065 days.

(21) Appl. No.: 11/366,100

(22) Filed: Mar. 2, 2006

(65) Prior Publication Data
US 2007/0067846 A1 Mar. 22, 2007

Related U.S. Application Data

(63) Continuation-in-part of application No. 11/232,004, filed on Sep. 22, 2005.

(51) Int. Cl.
*G06F 12/16* (2006.01)
*G06F 11/00* (2006.01)
*G06F 15/173* (2006.01)
*H04L 29/06* (2006.01)
*H04K 1/00* (2006.01)

(52) U.S. Cl. ............ 726/25; 726/23; 713/167; 709/224; 380/250

(58) Field of Classification Search .................... 726/25, 726/24
See application file for complete search history.

(56) References Cited

U.S. PATENT DOCUMENTS

| | | | |
|---|---|---|---|
| 5,751,965 A | 5/1998 | Mayo et al. | |
| 5,850,516 A | 12/1998 | Schneier | |
| 6,125,453 A | 9/2000 | Wyss | |
| 6,282,546 B1 | 8/2001 | Gleichauf et al. | |
| 6,298,445 B1 * | 10/2001 | Shostack et al. | 726/25 |
| 6,301,668 B1 | 10/2001 | Gleichauf et al. | |
| 6,321,338 B1 | 11/2001 | Porras et al. | |
| 6,535,227 B1 | 3/2003 | Fox et al. | |

(Continued)

FOREIGN PATENT DOCUMENTS

WO   WO 01/60024 A2   8/2001

(Continued)

OTHER PUBLICATIONS

Baybutt, Cyber security vulnerability analysis: An Asset-based approach, Dec. 2003, Process Safety Progress, vol. 22, No. 4. p. 220-228.*

(Continued)

*Primary Examiner* — David Pearson
*Assistant Examiner* — Morshed Mehedi
(74) *Attorney, Agent, or Firm* — Eckert Seamans Cherin & Mellott, LLC

(57) ABSTRACT

Systems and methods of associating security vulnerabilities and assets, and related Graphical User Interfaces (GUIs) and data structures, are disclosed. A definition of a security vulnerability, which includes multiple asset characteristics such as an asset platform that may be exploited via the security vulnerability and an asset platform that is affected when the exploited asset platform is exploited via the security vulnerability, is compared with definitions of one or more assets of an information system. An association between the security vulnerability and an asset is made if the definition of the asset includes a first asset characteristic of the security vulnerability definition and either the definition of the asset or the definition of another asset that has a relationship with the asset includes a second asset characteristic of the security vulnerability definition. The security vulnerability definition may also identify an asset platform that protects against the vulnerability.

13 Claims, 12 Drawing Sheets

U.S. PATENT DOCUMENTS

| | | | |
|---|---|---|---|
| 6,782,421 | B1 | 8/2004 | Soles et al. |
| 6,883,101 | B1* | 4/2005 | Fox et al. .................. 726/25 |
| 6,895,383 | B2 | 5/2005 | Heinrich |
| 6,907,531 | B1 | 6/2005 | Dodd et al. |
| 6,990,591 | B1 | 1/2006 | Pearson |
| 7,003,561 | B1 | 2/2006 | Magdych et al. |
| 7,152,105 | B2* | 12/2006 | McClure et al. ............ 709/224 |
| 7,240,213 | B1 | 7/2007 | Ritter |
| 7,243,148 | B2 | 7/2007 | Keir et al. |
| 7,257,630 | B2 | 8/2007 | Cole et al. |
| 7,299,489 | B1 | 11/2007 | Branigan et al. |
| 7,340,776 | B2* | 3/2008 | Zobel et al. ................. 726/24 |
| 7,359,962 | B2* | 4/2008 | Willebeek-LeMair et al. ............... 709/223 |
| 7,372,809 | B2 | 5/2008 | Chen et al. |
| 7,376,969 | B1 | 5/2008 | Njemanze et al. |
| 7,451,488 | B2* | 11/2008 | Cooper et al. .................. 726/25 |
| 7,523,504 | B2* | 4/2009 | Shah ............................ 726/25 |
| 2002/0078381 | A1 | 6/2002 | Farley et al. |
| 2002/0138416 | A1* | 9/2002 | Lovejoy et al. ................ 705/38 |
| 2002/0199122 | A1 | 12/2002 | Davis et al. |
| 2003/0046582 | A1 | 3/2003 | Black et al. |
| 2003/0097588 | A1* | 5/2003 | Fischman et al. ............ 713/200 |
| 2003/0126466 | A1* | 7/2003 | Park et al. ..................... 713/201 |
| 2003/0126472 | A1 | 7/2003 | Banzhof |
| 2003/0154269 | A1* | 8/2003 | Nyanchama et al. ......... 709/223 |
| 2003/0154393 | A1* | 8/2003 | Young .......................... 713/200 |
| 2003/0154404 | A1 | 8/2003 | Beadles et al. |
| 2003/0212909 | A1 | 11/2003 | Chandrashekhar et al. |
| 2003/0233438 | A1 | 12/2003 | Hutchinson et al. |
| 2004/0010571 | A1* | 1/2004 | Hutchinson et al. .......... 709/220 |
| 2004/0093513 | A1* | 5/2004 | Cantrell et al. ............... 713/201 |
| 2004/0102922 | A1 | 5/2004 | Tracy et al. |
| 2004/0143753 | A1* | 7/2004 | Hernacki et al. .............. 713/200 |
| 2004/0168086 | A1* | 8/2004 | Young et al. .................. 713/201 |
| 2004/0221176 | A1* | 11/2004 | Cole .............................. 713/201 |
| 2005/0010819 | A1* | 1/2005 | Williams et al. .............. 713/201 |
| 2005/0010821 | A1 | 1/2005 | Cooper et al. |
| 2005/0015672 | A1* | 1/2005 | Yamada .......................... 714/38 |
| 2005/0022021 | A1 | 1/2005 | Bardsley et al. |
| 2005/0039046 | A1* | 2/2005 | Bardsley et al. .............. 713/201 |
| 2005/0080720 | A1 | 4/2005 | Betz et al. |
| 2005/0091542 | A1 | 4/2005 | Banzhof |
| 2005/0114186 | A1 | 5/2005 | Heinrich |
| 2005/0160480 | A1* | 7/2005 | Birt et al. ......................... 726/25 |
| 2005/0177746 | A1 | 8/2005 | Bunn et al. |
| 2005/0193430 | A1* | 9/2005 | Cohen et al. .................... 726/25 |
| 2005/0257269 | A1* | 11/2005 | Chari et al. ...................... 726/25 |
| 2006/0005245 | A1 | 1/2006 | Durham et al. |
| 2006/0010497 | A1 | 1/2006 | O'Brien et al. |
| 2006/0021044 | A1 | 1/2006 | Cook |
| 2006/0136327 | A1 | 6/2006 | You |
| 2006/0156407 | A1* | 7/2006 | Cummins ....................... 726/25 |
| 2006/0191012 | A1 | 8/2006 | Banzhof et al. |
| 2007/0016955 | A1* | 1/2007 | Goldberg et al. ............... 726/25 |
| 2007/0067847 | A1 | 3/2007 | Wiemer et al. |
| 2007/0113265 | A2* | 5/2007 | Oliphant .......................... 726/1 |
| 2009/0076969 | A1 | 3/2009 | Sparks |

FOREIGN PATENT DOCUMENTS

WO    WO 02/054325 A2    7/2002

OTHER PUBLICATIONS

Stoneburner, G. et al., "Risk Management Guide for Information Technology Systems", NIST National Institute of Standards and Technology, XP007914492, Special Publication 800-30, Jul. 2002, 55 pp.

Sufatrio, et al., "A Machine-Oriented Integrated Vulnerability Database for Automated Vulnerability Detection and Processing", 2004 LISA XVIII—Nov. 14-19, 2004, pp. 47-57.

International Standard, "Information technology—Security techniques—Evaluation criteria for IT security—Part 1: Introduction and general model," ISO/IEC 15408-1:1999(E), First Edition Dec. 1, 1999, 62 pp.

Wu, William et al., Integrated Vulnerability Management System for Enterprise Networks, E-Technology, E-Commerce and E-Service, 2005. EEE '05. Proceedings. The 2005 IEEE International Conference on Hong Kong, China 29-01 Mar. 2005, Piscataway, NJ, USA, IEEE, Mar. 29, 2005, pp. 698-703.

Young-Hwan Bang, Yoon—Jung Jung, Injung Kim, Namhoon Lee, Gang-Soo Lee: "The Design and Development for Risk Analysis Automatic Tool" Online, [Online] 2004, pp. 491-499, XP002400108. Retrieved from the internet: URL:http://springerlink.metapress.com/content/1a5017n9txrumuur/fulltext.pdf> whole document, 9 pp.

Jansen, A. et al., "Adopting Internet-Centric Technologies in Network Management: The Internet has spawned a number of new technologies which are increasingly being used to enhance network and service management" Alcatel Telecommunications Review, Alcatel, Paris Cedex, FR, Jul. 2003 XP007005936 ISSN: 1267-7167, 10 pp.

Farahmand et al., Managing Vulnerabilities of Information Systems to Security Incidents, ICEC 2003, ACM 1-58113, pp. 348-354.

Apostolakis, G.E. et al., "A Screening Methodology for the Identification and Ranking of Infrastructure Vulnerabilities Due to Terrorism", XP-002457051, Risk Analysis, vol. 25, No. 2, 2005, pp. 361-376.

Schiffman, M., "The Common Vulnerability Scoring System", XP-002479898, The RSA Conference, Feb. 2005, 41 pp.

Polepeddi, S., "Software Vulnerability Taxonomy Consolidation", XP-002457428, UCRL-TH-208822, Jan. 4, 2005, 41 pp.

Böhme, R., "A Comparison of Market Approaches to Software Vulnerability Disclosure", Emerging Trends in Information and Communication Security Lecture Notes in Computer Science; LNCS, Springer-Verlag, BE, vol. 3995, 2006, pp. 298-311.

Ferson, S., "Fuzzy arithmetic in risk analysis". Aug. 2003. Available at http://web.archive.org/web/20030822232721/www.ramas.com/fuzzygood.ppt/www.ramas.com/fuzzygood.ppt. Downloaded Sep. 17, 2009, 30 pp.

Stamatelatos, G., "New Thrust for Probabilistic Risk Assessment (PRA) at NASA; Risk Analysis for Aerospace Systems II: Mission Success Starts with Safety". Oct. 28, 2002. Available at http://www.sra.org/docs/Stamatelatos.pdf. Downloaded Sep. 17, 2009, 45 pp.

Hayden, B. et al., "On the Generation of Short Paths and Minimal Cutsets of the Hierarchical Web Graph". Jul. 21, 2005. Available at http://dimax.rutaers.edu/~ehayden/REU%20all1.pdf. Downloaded Sep. 17, 2009, 8 pp.

Fleming, R., "Vulnerability Assessment Using a Fuzzy Logic Based Method". Dec. 7, 1993. Available at http://handle.dtic.mil/100.2/ADA274075. Downloaded Sep. 17, 2009, 101 pp.

Liang, W., Efficient Enumeration of All Minimal Separators in a Graph, Theoretical Computer Science, 180: 169-180, 1997.

Karas, W., C++AVL Tree Template Version 1.3, http://www.geocities.com/wkaras/gen_cpp/avl_tree.html?200522, Aug. 22, 2005.

Maggio, "Space Shuttle Probabilistic Risk Assessment: Methodology & Application", 1996 Proceedings Annual, Reliability and Maintainability Symposium, pp. 121-132, Jan. 25, 1996.

Hong et al., "Efficient enumeration of all minimal separators in a graph", Theoretical Computer Science, Jun. 10, 1997, pp. 169-180, vol. 180, No. 1-2, Australia.

Kloks et al., "Finding all minimal separators in a graph", Proceedings of 11th Symposium of Theoretical Aspects of Computer Science, Feb. 1994, pp. 759-768, Berlin.

Littlewood, B., Broclehurst, S., Fenton, N., Mellor, P., Page, S., Wright, D., Dobson, J., McDermid, J., and Gollman, D. 1993. Towards Operational Measures of Computer Security. J. Comput. Sec. 2, 2. Available at http://www.csr.city.ac.uk/people/bev.littlewood/bl_public_papers/Measurement of security/Quantitative_security.pdf. Downloaded Sep. 17, 2009, 24 pp.

"Common Criteria International Standard ISO/IEC 15408:1999". Aug 1999. Available at http://www.niap-ccevs.org/cc-scheme/cc_docs/cc_v21_part1.pdf. Downloaded Sep. 17, 2009, 61 pp.

US Final Office Action dated May 12, 2011 for U.S. Appl. No. 11/366,101 (31 pages).

US Non-Final Office Action dated Oct. 28, 2010 for U.S. Appl. No. 11/366,101 (28 pages).

US Final Office Action dated Jun. 3, 2010 for U.S. Appl. No. 11/366,101 (28 pages).

US Non-Final Office Action dated Dec. 9, 2009 for U.S. Appl. No. 11/366,101 (31 pages).

US Non-Final Office Action dated May 26, 2009 for U.S. Appl. No. 11/366,101 (23 pages).
US Final Office Action dated Nov. 6, 2009 for U.S. Appl. No. 11/366,319 (29 pages).
US Non-Final Office Action dated Jun. 17, 2009 for U.S. Appl. No. 11/366,319 (26 pages).
US Final Office Action dated Aug. 20, 2009 for U.S. Appl. No. 11/132,118 (10 pages).
US Non-Final Office Action dated Jan. 22, 2009 for U.S. Appl. No. 11/132,118 (10 pages).
US Non-Final Office Action dated Apr. 23, 2010 for U.S. Appl. No. 11/232,004 (21 pages).
US Non-Final Office Action dated Nov. 27, 2009 for U.S. Appl. No. 11/232,004 (8 pages).
US Final Office Action dated May 15, 2009 for U.S. Appl. No. 11/232,004 (25 pages).
US Non-Final Office Action dated Dec. 9, 2008 for U.S. Appl. No. 11/232,004 (22 pages).
Decision to refuse a European Patent Application (Form 2007) dated Mar. 3, 2011 for European Patent Application No. 06 300 970.8 (10 pages).
Summons to attend oral proceedings pursuant to Rule 115(1) EPC dated Sep. 9, 2010 for European Patent Application No. 06 300 970.8 (7 pages).
Communication pursuant to Article 94(3) EPC dated Feb. 13, 2009 for European Patent Application No. 06 300 970.8 (1 page).
Extended European Search Report dated Jun. 4, 2008 for European Patent Application No. 06 300 970.8 (18 pages).
Partial European Search Report dated Nov. 12, 2007 for European Patent Application No. 06 300 970.8 (5 pages).
Communication pursuant to Article 94(3) EPC dated Jan. 20, 2011 for European Patent Application No. 06 300 978.1 (10 pages).
Summons to attend oral proceedings pursuant to Rule 115(1) EPC dated Sep. 9, 2010 for European Patent Application No. 06 300 978.1 (6 pages).
Communication pursuant to Article 94(3) EPC dated Jul. 31, 2008 for European Patent Application No. 06 300 978.1 (1 page).
Extended European Search Report dated Dec. 3, 2007 for European Patent Application No. 06 300 978.1 (8 pages).
Summons to attend oral proceedings pursuant to Rule 115(1) EPC dated Sep. 9, 2010 for European Patent Application No. 06 300 971.6 (5 pages).
Communication pursuant to Article 94(3) EPC dated Nov. 20, 2008 for European Patent Application No. 06 300 971.6 (1 page).
Extended European Search Report dated Mar. 26, 2008 for European Patent Application No. 06 300 971.6 (12 pages).
Partial European Search Report dated Dec. 6, 2007 for European Patent Application No. 06 300 971.6 (4 pages).
Extended European Search Report dated Jan. 12, 2011 for European Divisional Patent Application No. 10 183 806.8 (4 pages).
Decision of Rejection dated Feb. 5, 2010 for Chinese Patent Application No. 200610168913.X with English Translation (10 pages).
Notification and First Office Action dated Jul. 3, 2009 for Chinese Patent Application No. 200610168913.X with English Translation (10 pages).
Notification and First Office Action dated Aug. 3, 2010 for Chinese Patent Application No. 200610144429.3 with English Translation (12 pages).
Notification and second Office Action dated Feb. 5, 2010 for Chinese Patent Application No. 200610144762.4 with English Translation (9 pages).
Notification and First Office Action dated Jun. 5, 2009 for Chinese Patent Application No. 200610144762.4 with English Translation (23 pages).
US Final Office Action dated Aug. 28, 2009 for U.S. Appl. No. 11/131,598 (13 pages).
US Non-Final Office Action dated Mar. 13, 2009 for U.S. Appl. No. 11/131,598 (12 pages).

* cited by examiner

SYSTEMS AND METHODS OF ASSOCIATING SECURITY VULNERABILITIES AND ASSETS

CROSS-REFERENCE TO RELATED APPLICATION

The present application is related to U.S. patent application Ser. No. 11/131,598, entitled "SECURITY RISK ANALYSIS SYSTEMS AND METHODS", and filed on May 18, 2005, to U.S. patent application Ser. No. 11/132,118, entitled "COMMUNICATION NETWORK SECURITY RISK EXPOSURE MANAGEMENT SYSTEMS AND METHODS", and filed on May 18, 2005, to U.S. patent application Ser. No. 11/366,101, entitled "INFORMATION SYSTEM SERVICE-LEVEL SECURITY RISK ANALYSIS", and filed of even date herewith, and to U.S. patent application Ser. No. 11/366,319, entitled "SECURITY VULNERABILITY INFORMATION AGGREGATION", and filed of even date herewith.

This application also claims the benefit of U.S. patent application Ser. No. 11/232,004, entitled "APPLICATION OF CUT-SETS TO NETWORK INTERDEPENDENCY SECURITY RISK ASSESSMENT", and filed on Sep. 22, 2005, and is a continuation-in-part thereof.

The entire contents of each of the above-identified applications are incorporated into the present application by reference.

FIELD OF THE INVENTION

This invention relates generally to information system security, and in particular, to associating security vulnerabilities and information system assets.

BACKGROUND

In complex systems such as telecommunications and Information Technology (IT) infrastructures, the potential impacts of security vulnerabilities, even if discovered and disclosed, tend to be difficult to assess in a timely fashion. This is primarily due to the number and nature of these vulnerabilities, as well as the number of assets in such systems. Some assets may also have embedded software layers and other dependencies, which further complicates security assessments.

The capacity to understand and make informed decisions soon after a vulnerability is disclosed is one key aspect of proactive security. Such capacity allows network operators, for example, to understand the security state, i.e., the risk to a network infrastructure, at any given time and assign a priority action list for risk mitigation. Identification of commercial risks associated with relying on data stored and transmitted on network segments during a period of elevated security risk may also be of use in performing a comprehensive security assessment.

One currently available security assessment tool provides models of attack paths. A model may be used to examine how a sequence of attacks based on known vulnerabilities can allow another asset to be attacked. Each relationship between an asset and a vulnerability in the sequence, however, is treated as a single association, such that each attack does not have inherent knowledge of a previous attack in the sequence.

Currently available tools do not distinguish between assets that a vulnerability can exploit, assets it can affect, and assets that can protect against it. As such, these tools have a limited capability to model the reality of complex relationships between assets. This can limit the accuracy and completeness of asset/vulnerability associations and security models generated by such tools.

As a simple example of the limits of current tools, assume that a security vulnerability in a software application may be used to cause a buffer overflow in an operating system, and that remote access to a particular computer system on which the operating system and the software application are executed is prevented by a personal firewall on the computer system. In this case, an attack on the software application may affect the operating system, and the personal firewall protects the software application. Existing tools would model only the relationship between the vulnerability and the software application. The operating system effects might be captured in a description of the vulnerability, but existing tools are not able to determine from such a description that the operating system is also at risk. Furthermore, the protective mechanisms provided by the personal firewall could only be considered in an indirect way, not directly associated with the vulnerability.

Thus, there remains a need for improved techniques for associating security vulnerabilities and assets.

SUMMARY OF THE INVENTION

Embodiments of the invention enable detailed assessment of risks to assets, due to security vulnerabilities in the assets and relationships between assets. Asset relationships allow the effects of vulnerabilities to propagate from assets that are directly affected by exploiting vulnerabilities to assets that have a dependency on the exploited assets. A distinction may be made between a vulnerability exploiting an asset, a vulnerability affecting an asset, and a vulnerability being mitigated or protected by an asset, to thereby provide for a more accurate assessment of the level of risk to the assets. These different relationships may also allow more detailed information to be provided to network and security operators to remediate the vulnerabilities.

An aspect of the present invention provides an apparatus that includes a comparison module and an association module operatively coupled to the comparison module. The comparison module is configured for comparing a definition of a security vulnerability with one or more definitions of one or more assets of an information system. The security vulnerability definition includes a plurality of asset characteristics. The association module is configured for associating the security vulnerability and a particular asset of the one or more assets where (i) the definition of the particular asset includes a first asset characteristic of the plurality of asset characteristics in the security vulnerability definition and (ii) either the definition of the particular asset or the definition of another asset of the one or more assets that has a relationship with the particular asset includes a second asset characteristic of the plurality of asset characteristics in the security vulnerability definition.

The first asset characteristic may identify one of an asset platform that may be exploited via the security vulnerability and an asset platform that is affected when the exploited asset platform is exploited via the security vulnerability. In this case, the second asset characteristic identifies the other of the asset platform that may be exploited via the security vulnerability and the asset platform that is affected when the exploited asset platform is exploited via the security vulnerability.

The first asset characteristic and the second asset characteristic may identify a common asset platform.

The association module may be further configured for associating the security vulnerability and the other asset where the definition of the particular asset includes the first asset characteristic and the definition of the other asset includes the second asset characteristic.

In some embodiments, the association module is configured for associating the security vulnerability and the particular asset by modifying at least one of: the security vulnerability definition and the definition of the particular asset. The association module may instead associate the security vulnerability and the particular asset by accessing a memory to create a logical association between the security vulnerability and the particular asset.

The plurality of asset characteristics may also include a third asset characteristic identifying a protecting asset platform that protects the exploited asset platform or the affected asset platform against the security vulnerability. The association module may then be further configured for creating a further association between the security vulnerability and an asset of the one or more assets where (i) the definition of the particular asset includes the first asset characteristic, (ii) either the definition of the particular asset or the definition of the other asset includes the second asset characteristic, (iii) the definition of an asset of the one or more assets includes the third asset characteristic, and (iv) the asset defined by the definition that includes the third asset characteristic is, or has a relationship with, the one of the particular asset and the other asset whose definition includes the asset platform that is protected by the protecting asset platform.

The association module may also be configured for performing, where the further association is to be created, an operation selected from the group consisting of: aborting the associating of the security vulnerability and the particular asset, and removing an association between the security vulnerability and the particular asset.

If the first asset characteristic identifies an asset platform that may be exploited via the security vulnerability and the second asset characteristic identifies an asset platform that is affected when the exploited asset platform is exploited via the security vulnerability, the comparison module may be configured for comparing the first asset characteristic to a definition of each asset in a first group of the one or more assets, and for comparing the second asset characteristic to a definition of each asset in a second group of the one or more assets where the definition of at least one asset of the one or more assets in the first group includes the first asset characteristic.

In some embodiments, the second group includes the at least one asset and each asset having a relationship with the at least one asset.

Another aspect of the invention provides a method that involves comparing a definition of a security vulnerability with one or more definitions of one or more assets of an information system, the security vulnerability definition comprising a plurality of asset characteristics, determining whether the definition of an asset of the one or more assets includes a first asset characteristic of the plurality of asset characteristics in the security vulnerability definition, where the definition of an asset of the one or more assets includes the first asset characteristic, determining whether either the definition of the asset or the definition of another asset of the one or more assets that has a relationship with the asset includes a second asset characteristic of the plurality of asset characteristics in the security vulnerability definition, and associating the security vulnerability and the asset where (i) the definition of the asset includes the first asset characteristic and (ii) either the definition of the asset or the definition of another asset of the one or more assets that has a relationship with the asset includes the second asset characteristic.

The method may also involve associating the security vulnerability and the other asset where the definition of the asset includes the first asset characteristic and the definition of the other asset includes the second asset characteristic.

Where the definition of the asset includes the first asset characteristic and either the definition of the asset or the definition of the other asset includes the second asset characteristic, the method may also involve determining whether the definition of an asset of the one or more assets includes a third asset characteristic of the plurality of asset characteristics in the security vulnerability definition, the third asset characteristic identifying a protecting asset platform that protects the exploited asset platform or the affected asset platform against the security vulnerability, determining, where the definition of an asset includes the third asset characteristic, whether the asset defined by the definition that includes the third asset characteristic is, or has a relationship with, the one of the asset and the other asset whose definition includes the asset platform that is protected by the protecting asset platform, and associating the security vulnerability and the asset defined by the definition that includes the third asset characteristic where the asset defined by the definition that includes the third asset characteristic is, or has a relationship with, the one of the asset and the other asset whose definition includes the asset platform that is protected by the protecting asset platform.

The operation of associating may involve accessing a memory to create a logical association between the security vulnerability and the asset.

The method may be implemented, for example, in instructions stored on a machine-readable medium.

A Graphical User Interface (GUI) is also provided, and includes a representation of a security vulnerability via which an asset of an information system may be exploited to thereby affect the asset or another asset of the information system that has a relationship with the asset, a representation of the asset, a representation of a first type of association between the security vulnerability and the asset, and a representation of a second type of association either between the security vulnerability and the asset, where the asset may be exploited via the security vulnerability to affect the asset, or between the security vulnerability and the other asset, where the asset may be exploited via the security vulnerability to affect the other asset.

The GUI may also include, where the asset may be exploited via the security vulnerability to affect another asset of the information system that has a relationship with the asset, a representation of the relationship between the asset and the other asset.

Where the asset is protected from the security vulnerability by another asset of the information system that has a relationship with the asset, the GUI may include a representation of the other asset, and a representation of the relationship between the asset and the other asset.

According to a further aspect of the invention, there is provided a machine-readable medium storing a data structure. The data structure includes an indication of a first type of association between an asset of an information system and a security vulnerability via which the asset may be exploited to thereby affect the asset or another asset of the information system that has a relationship with the asset, and an indication of a second type of association either between the security vulnerability and the asset, where the asset may be exploited via the security vulnerability to affect the asset, or between the security vulnerability and the other asset, where the asset may be exploited via the security vulnerability to affect the other asset.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
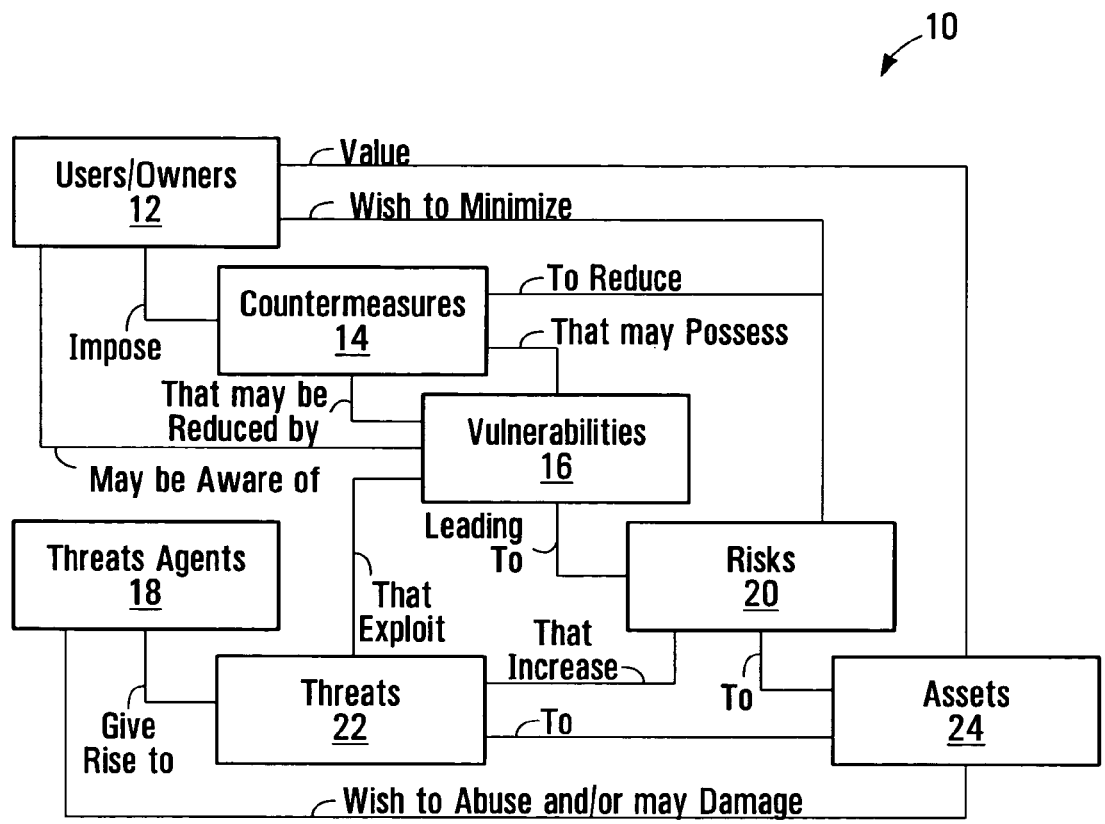
FIG. 1 is a block diagram representation of general security concepts.

As described briefly above, currently available security assessment and management tools do not provide for a complete and comprehensive assessment of security, especially for complex information systems such as communication networks.

For example, four classes of system may be identified as providing partial solutions to security and vulnerability management in a network infrastructure. These classes include network vulnerability scanners, intrusion detection/prevention systems, security event/information systems, and exposure risk management systems.

Of these classes, the exposure risk management systems class includes the most extensive tools. A risk management system might provide, for example, a view of a network, including scanners data and vulnerability data on an element-by-element basis for network elements such as firewalls and routers, servers, and other hosts. Typically, each element is scanned or otherwise assessed, on its own, to determine its vulnerabilities. Visual maps of an enterprise network, business applications, and potential security problems give security personnel an overview of infrastructure security for each individual element and enables drill-down capabilities for more detailed views relating to specific elements.

A form of business risk may be calculated by assessing both the likelihood of an attack and damage potential as measured by business impact variables. Risk factors might be determined at a detailed level, taking into account various attack scenarios and vulnerabilities.

However, currently known tools cannot address the scope of large telecommunications systems. These tools cannot provide a realistic view for a complex network or take into account different groups or assets, or relationships between assets.

In addition, business risk calculations use attack likelihood based on path determination, i.e., determining a chain of vulnerabilities and assets used to complete an attack. In a large and complex network it is extremely difficult, and thus impractical if not effectively impossible, to determine an attack path for every possible attack and therefore its likelihood.

Reducing risk calculation to a specific attack path in this manner may be more efficient for a particular vulnerability or combination of vulnerabilities, but could lead to misunderstanding of a more complex situation. This simplification could effectively cause an operator or other personnel to minimize the actual risk, which could have a huge impact on the overall assessment of the security state of a network.

Associations between vulnerabilities and assets according to embodiments of the invention may be used, for example, in risk exposure management techniques. A flexible security model may provide a flexible asset representation model for mission- and/or service-specific assets deployed in a communication network as well as physical/logical topology of the network. A fully customizable and flexible risk exposure calculation may also take into account general security methodologies as well an extension scheme which accounts for specific commercial business risk.

FIG. 1 is a block diagram representation of general security concepts that are relevant to the technical field of the present invention. The representation 10 shown in FIG. 1 illustrates an underlying security paradigm and derived concept based on the Common Criteria International Standard ISO/IEC 15408:1999 for Information Technology Security Evaluation.

FIG. 1 shows users or owners 12, countermeasures 14, vulnerabilities 16, threat agents 18, threats 22, risks 20, and assets 24. Those skilled in the art will be familiar with the general security paradigm represented in FIG. 1, which is therefore described only briefly herein.

Users/owners 12 may include, for example, owners or operators of a communication network, or other stakeholders having an interest in assets 24.

Countermeasures 14 represent actions, such as upgrading an operating system or application software on a computer system asset for instance, which may be taken to reduce vulnerabilities 16. A vulnerability 16 is a condition in an asset's operation which makes it susceptible to an attack, or possibly a failure. A security hole in operating system software is one illustrative example of a vulnerability.

Threat agents 18 are parties wishing to abuse or use assets 24 in a manner not intended by their users/owners 12. A threat 22 is an indication, illustratively a probability, that an asset 24 may be harmed.

Assets 24, in the example of a communication network, are components of the network and may be either physical or logical. Vulnerabilities 16 may exist for each type of asset 24.

As shown in FIG. 1, users/owners 12 value assets, wish to minimize risks 20 to the assets 24, and may be aware of vulnerabilities 16 which lead to risks 20 to assets 24. Vulnerabilities 16 may be reduced by the users/owners 12 by imposing countermeasures 14. Inter-relations between other concepts shown in FIG. 1 will be apparent to those skilled in the art from a review thereof.

Figure 2:
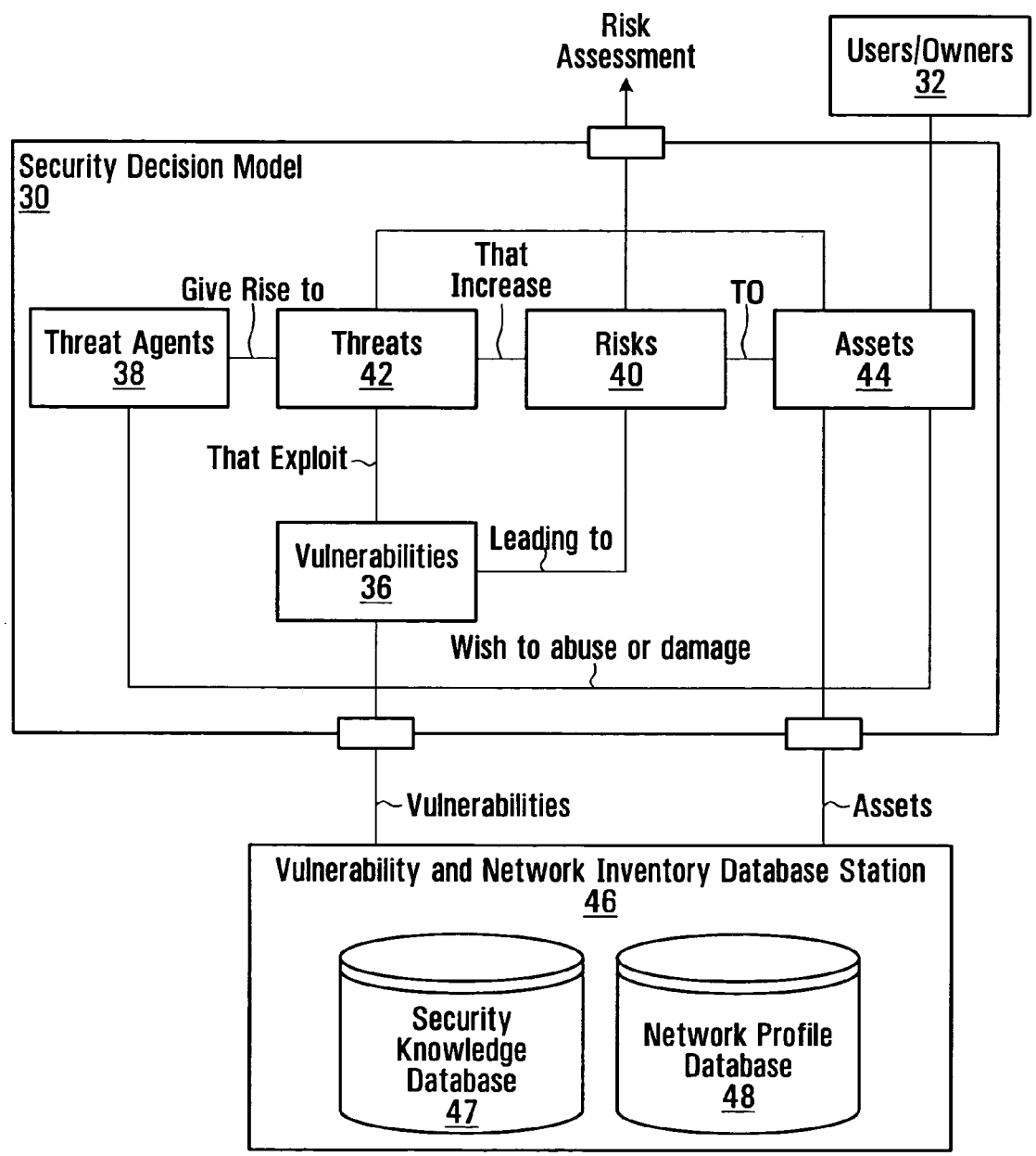
FIG. 2 is a block diagram representation of a security decision model.

An adaptation of the concepts shown in FIG. 1 and how they relate to the present invention are represented in FIG. 2, which is a block diagram representation of a security decision model.

The users/owners 32, threat agents 38, threats 42, risks 40, assets 44, and vulnerabilities 36 in FIG. 2 may be substantially the same as similarly labelled components of FIG. 1, but are handled differently than in conventional techniques according to embodiments of the invention.

The vulnerability and network inventory database system 46 includes databases which store either information associated with vulnerabilities and assets or information from which vulnerability and asset information may be derived. In the example shown in FIG. 2, the database system 46 includes a security knowledge database 47 which stores information associated with known vulnerabilities or security information which is converted or otherwise processed to generate vulnerability information. This type of information is referred to herein generally as security vulnerability definitions. The network profile database 48 stores network inventory information. Definitions of assets, which include information associated with assets in an information system such as a communication network may be obtained from the network profile database 48 or derived from information which is obtained from the network profile database 48.

It should be appreciated that a communication network is one example of a system to which the techniques disclosed herein may be applied. These techniques may be applied to other types of information system.

Various implementations of the database system 46 will be apparent to those skilled in the art. For example, any of many different types of data storage device, such as disk drives and solid state memory devices, may be used to store the databases 47, 48. According to one particular embodiment of the invention, the databases 47, 48 are stored at a computer system which also executes software implementing the security decision model 30. It should be appreciated, however, that the database system 46 is intended to more generally represent a system through which vulnerability and asset information, or information from which these can be derived, is accessible. The databases 47, 48 may thus be remote databases which are made accessible to the model 30 through appropriate interfaces and connections. The databases 47, 48 may reside at a server in a Local Area Network (LAN), for example, in which case information is accessible through a network interface and LAN connections.

In operation, the security decision model 30 takes into account assets and vulnerabilities to determine a risk assessment. The risk assessment provides an indication of current network security state to the users/owners 32.

Figure 3:
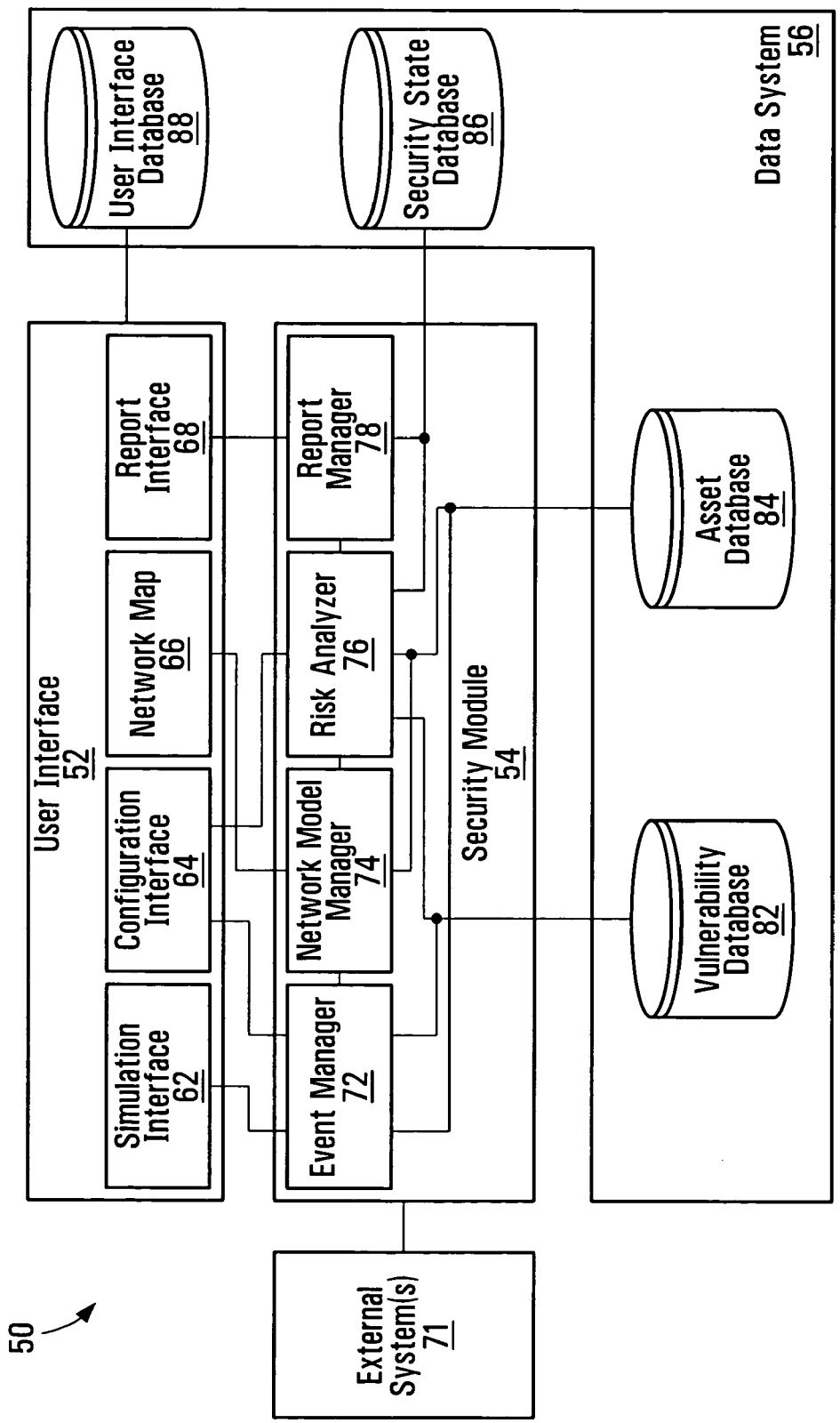
FIG. 3 is a block diagram of a security risk exposure management system in which vulnerability and asset information may be used.

The security decision model 30 may be implemented as shown in FIG. 3, which is a block diagram of a security risk exposure management system.

The architecture of the system 50 includes three main elements, namely the user interface 52, the security module 54, and the data system 56. In one embodiment, these elements are implemented in a computer system. The user interface 52 might then be provided through a display and input devices such as a keyboard, mouse, and/or a touchscreen, the security module 54 could be implemented primarily in software for storage in a memory of the computer system and execution by a processor, and the data system 56 could include local stores, interfaces to remote stores, or some combination thereof.

It should be appreciated that embodiments of the invention may include further, fewer, or different elements, with different interconnections, than those explicitly shown in FIG. 3. For example, a security risk management system might not include every element shown in FIG. 3. A computer system or other equipment in which the system 50 or another embodiment of the invention is implemented may also include further elements used for other functions. A processor in a computer system would typically execute operating system software in addition to application software implementing security risk management functions for instance. Thus, FIG. 3, as well as the other drawings, are intended solely for illustrative purposes, and not to limit the scope of the invention.

In the particular example embodiment shown in FIG. 3, the user interface 52 includes a simulation interface 62, a configuration interface 64, a network map 66 and a report interface 68. These user interface elements 62, 64, 66, 68 interact with the security module 54 to accept user inputs and/or to provide outputs to users. A display, keyboard, mouse, and touchscreen represent examples of the types of input and output device through which information may be transferred between users and the security module 54. These elements may also have associated software components for execution by a processor to process and transfer input and output information.

The simulation interface 62, the configuration interface 64, the network map 66, and the report interface 68 are operatively coupled to the security module 54. The form of connections through which these elements interact is dependent upon the particular type of equipment in which the system 50 is implemented. Internal bus structures, for example, are often used in computer systems, and thus interactions between the user interface 52 and its components with the security module 54, as well as the data system 56, may be enabled through internal connections, drivers, and interfaces between a processor and various input/output devices. However, other types of connection may also or instead be used.

The security module 54 includes an event manager 72 which is operatively coupled to the simulation interface 62, to the configuration interface 64, to one or more external systems 71, and to the data system 56, a network model manager 74 which is operatively coupled to the network map 66, to the event manager 72, and to the data system 56, a risk analyzer 76 which is operatively coupled to the configuration interface 64, to the network model manager 74, and to the data system 56, and a report manager 78 which is operatively coupled to the risk analyzer 76, to the report interface 68, and to the data system 56. These components of the security module 54, like those of the user interface 52, may be implemented in hardware, software for execution by a processor, or some combination thereof.

The data system 56 includes a vulnerability database 82 which is operatively coupled to the event manager 72 and to the risk analyzer 76, an asset database 84 which is operatively coupled to the event manager 72, to the network model manager 74, and to the risk analyzer 76, a security state database 86 which is operatively coupled to the risk analyzer 76 and to the report manager 78, and a user interface database 88 which is operatively coupled to the user interface 52. These databases may be stored in any of various types of storage device, such as solid state memory devices, disk drives, and other types of storage device which use fixed, movable, or possibly removable storage media. The data system 56 may include either data stores or interfaces through which remote data stores are accessible, as noted above in conjunction with FIG. 2. Although shown separately in FIG. 3, multiple databases 82, 84, 86, 88 may be stored in one data store or memory device.

The vulnerability database 82 stores information associated with vulnerabilities, and the asset database 84 stores information associated with assets. These databases represent examples of the databases 47, 48 (FIG. 2). Data structures which may be stored in the databases 82, 84 in accordance with embodiments of the invention are provided below.

The security state database 86 stores information associated with historical and/or current security risk status of a system. Information associated with the user interface 52, such as different network views and placement of icons which have been configured by a user, is stored in the user interface database 88.

Initial configuration of the system 50 for operation may involve storing vulnerability information and asset information in the databases 82, 84. Vulnerability and asset information may be manually entered by network operator personnel for example, and/or imported from an existing data store or other source. The databases 82, 84 may be populated through the event manager 72, as described below, or possibly a further interface (not shown) through which the databases 82, 84 are accessible.

The event manager 72 processes incoming events, such as initial network and vulnerability configuration information, introduction of a new vulnerability, or a change in the network topology or configuration. Information may be received by the event manager 72 from the simulation interface 62, the configuration interface 64, or one or more external systems 71 such as a Network Management System (NMS) of a communication network.

Through the simulation interface 62, a user may make trial or temporary changes in a network. This allows users to investigate the effects of changes, countermeasures for instance, before these changes are actually made in the network. A simulation event from the simulation interface 62 is preferably handled in a different manner than changes or updates received from other sources, so that temporary simulation changes do not affect vulnerabilities and assets which reflect actual network conditions. This may be accomplished, for example, by providing separate simulation databases to which temporary changes are applied. Simulation databases could be stored until explicitly deleted or cleared by a user, depending upon the amount of storage space available in the data system 56, or automatically deleted when a user closes or exits the simulation interface 62.

Information received by the event manager 72 from the configuration interface 64 or external system(s) 71 which affects actual vulnerabilities or network assets may be processed and written to the databases 82, 84. The nature of the processing performed by the event manager 72 may be dependent on the type, format, and/or source of the information for instance.

Information entered through the configuration interface 64 may already be formatted according to data structures used to store information in the databases 82, 84 and can be written to the databases without significant processing. In the case of information received from external systems 71, however, processing such as format and/or content conversions may be performed by the event manager 72. For example, e-mail updates including advisories of new vulnerabilities discovered by vendors of software used in a network may be received and processed by the event manager 72 or another component, and used to update the vulnerability database 82. Network equipment or configuration updates received from an NMS might involve an intermediate level of processing, generally less processing than information from other external systems 71 but possibly more processing than information from the internal configuration interface 64.

The event manager 72 may thus receive information associated with vulnerabilities and assets, and update current vulnerabilities and assets, or more specifically information in the databases 82, 84, based on the received information.

The network model manager 74 captures a representation of the network being analyzed from the event manager 72, the asset database 84, or both, to present the network map 66 to a user. Assets and their relationships, as specified in the asset database 84, and possibly also vulnerabilities and their associations with assets as specified in the vulnerability database 82 and/or the asset database 84, are used by the network model manager 74 to build a model of the network. Events affecting a current network model may be passed from the event manager 72 to the network model manager 74, or stored in the asset database 84 for access by the network model manager 74. It should thus be appreciated that the network model manager 74 need not necessarily be physically coupled to the event manager 72. In some embodiments, the simulation interface 62 and the configuration interface 64 may be operatively coupled to the network model manager 74 to apply changes to a model.

The risk analyzer 76 performs risk analysis and calculations. In accordance with an aspect of the invention, the risk analyzer 76 determines vulnerabilities affecting assets of a communication network, and determines risks in the communication network by analyzing the vulnerabilities and assets. Information associated with the vulnerabilities and assets is stored in the databases 82, 84 as noted above, and accessed by the risk analyzer 76.

Assets may include either or both of physical assets, illustratively equipment in the communication network, and logical assets such as software running on equipment in the communication network and information stored by equipment in the communication network.

Indications of risks determined by the risk analyzer 76 are provided to the network model manager 74, so that a representation of the communication network and the determined risks can be provided to a user through the user interface 52 in the form of the network map 66. The network map 66 thus includes both a representation of the network and detailed security risk information. Any of many different types and layouts of the network map 66 may be used to present results of a risk analysis. A graphical representation of a network in which assets and risks are shown using icons or images, text, or some combination thereof, may provide a most effective indication of a current security state of the network. In some embodiments, the format and layout of the network map 66 is in accordance with previously established user interface settings stored in the user interface database 88.

The system 50 is in no way limited to any particular type of representation or output. For example, indications such as alarms or warnings, which may be provided locally through the user interface 52 or transmitted to a remote system such as a pager or an e-mail client for instance, are also contemplated.

In accordance with an embodiment of the invention, representations of any or all of vulnerabilities, assets, associations between vulnerabilities and assets, and relationships between assets may also be provided in graphical and/or other forms.

The risk analyzer 76 may also provide security risk information to either or both of the report manager 78 and the security state database 86. In FIG. 3, the risk analyzer 76 is operatively coupled to both the report manager 78 and the security state database 86. Outputs from the risk analyzer 76 may instead be provided to the security state database 86 through the report manager 78. Another possible option would be to operatively couple the risk analyzer 76 and the report manager 78 to the security state database 86. In this case, outputs from the risk analyzer 76 are provided to the security state database 86, and information in the security state database 86 is then accessed by the report manager 78 to provide reports to a user through the report interface 68.

The report interface 68 may also receive risk report selection inputs from a user for configuring reports of the risks determined by the risk analyzer 76. Risk report selection inputs may control the content, format, or both, of reports generated by the report manager 78. Responsive to risk report selection inputs received through the report interface 68, the report manager 78 accesses security risk information, in the security state database 86 for instance, and generates a customized report for a user.

Through the configuration interface 64, a user may provide network configuration information associated with vulnerabilities, assets, or both, so as to effectively change the communication network being analyzed.

The configuration interface 64 may also be used to enter risk analysis configuration information for configuring an analysis process applied to the vulnerabilities and assets by the risk analyzer 76. The risk analysis process is adapted in accordance with risk analysis configuration information provided by a user. Risk analysis adaptation may involve selecting specific types of risk calculations or parameters therefor, for example.

Particular communication network features may also be selected for analysis. A user may be interested in assessing risk for a specific network asset, for a specific service provided by the network, or for a specific mission which is carried out using the communication network.

Once a service, mission, or other network feature is selected, the risk analyzer 76 determines vulnerabilities which affect the selected feature or assets in the network associated with the selected feature, illustratively by accessing the databases 82, 84. The risk analyzer 76 then determines risks to the selected feature by analyzing the vulnerabilities and assets. An indication of feature-specific risks may then be provided through the network model manager 74, the report manager 78, or both.

Figure 4:
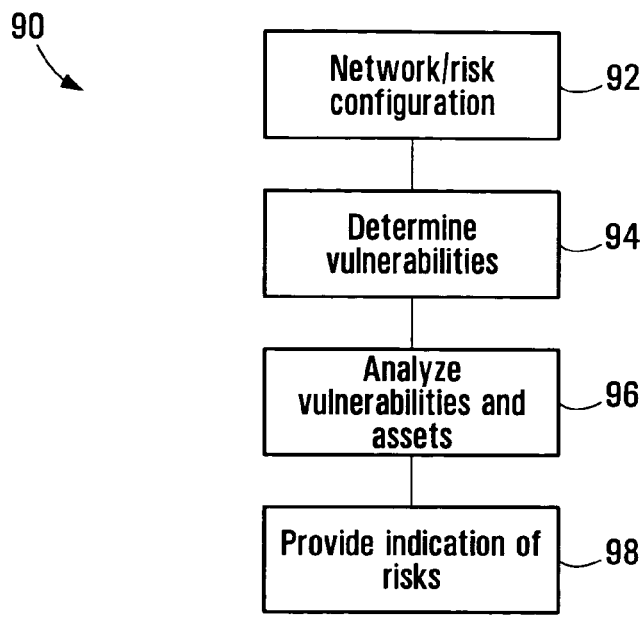
FIG. 4 is a flow diagram illustrating a security risk management method.

Security risk analysis has been described above primarily in the context of a system. FIG. 4 is a flow diagram illustrating a security risk management method.

The method 90 begins at 92 with an operation of network and/or risk configuration. This operation may involve, for example, any or all of populating or updating vulnerability and/or asset information, selection of one or more specific network features for security risk analysis, and adaptation of a risk analysis process.

Where a specific network feature is specified at 92, vulnerabilities affecting a selected network feature and/or associated assets, or all assets where network-wide security analysis is to be performed, are determined at 94, and the vulnerabilities and assets are analyzed at 96 to determine risks in the communication network. An indication of the determined risks is provided at 98.

It should be appreciated that the method 90 is intended solely for illustrative purposes, and not to limit the scope of the invention. Embodiments of the invention may be implemented with fewer or further operations than those shown in FIG. 4, or the illustrated operations may be performed in a different order. For example, the method 90 might be repeated when network vulnerabilities and/or assets are updated or for different simulation scenarios.

Analysis of assets and vulnerabilities by the risk analyzer 76 may also involve risk exposure calculations described in further detail below.

For example, the risk analyzer 76 may also take relationships between assets into consideration so as to propagate the effects of vulnerabilities and risks throughout a network. Propagation of vulnerabilities allows risk analysis to take into account vulnerabilities which affect not only a particular asset, but also those which affect other assets which have relationships with that asset. A determination of risk for the particular asset may thus be based on both its own vulnerabilities and the propagated vulnerabilities which affect related assets. Therefore, the effects of vulnerabilities, risks, or both, may be propagated, and references herein to propagation of vulnerabilities and risks should be interpreted accordingly.

Embodiments of the invention provide particular vulnerability and asset associations based on vulnerability definitions and one or more asset definitions. In the case of more than one asset definition, associations are also dependent upon relationships between assets, as described in further detail below. Conventional security risk management tools, as noted above, do not support complex associations between vulnerabilities and assets or relationships between assets.

Figure 5:
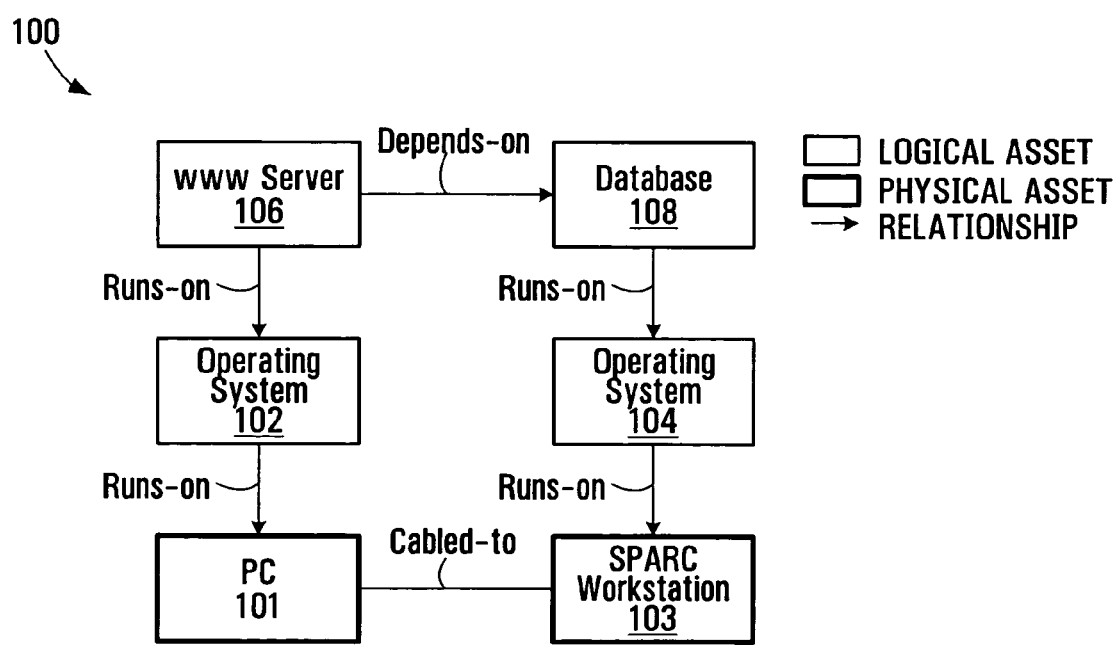
FIG. 5 is a block diagram illustrating types of assets.

In regard to association- and relationship-based aspects of the invention, it may be useful to first consider relationships which may exist between types of assets. FIG. 5 is a block diagram illustrating types of assets, as well as examples of how assets may be related to other assets, i.e., inter-asset relationships.

As noted above, an asset may be a physical or logical component of a communication network. In the system 100 of FIG. 5, the personal computer (PC) 101 and the SPARC workstation 103 are physical assets, and the operating systems 102, 104, the Internet (WWW) server 106, and the database 108 are logical assets.

Relationships between these assets are also shown in FIG. 5. An information system may be is described by not only assets, but also the relationships between them. A relationship describes how assets are interconnected and/or their functional dependencies.

In FIG. 5, the PC 101 and the workstation 103 have a "cabled-to" relationship, indicating that these assets communicate through some sort of communication link, such as a physical connection through a communication network. The operating systems 102, 104 are executed by processors at the PC 101 and the workstation 103, and thus have a "runs-on" relationship with the PC 101 and the workstation 103, respectively.

The server 106 and the database 108 are supported by software which is also executed by processors in the PC 101 and the workstation 103. As this type of software would normally be executed by or within the operating systems 102, 104, the server 106 and the database 108 have a "runs-on" relationship with the operating systems 102, 104, respectively.

Another type of relationship is illustrated in FIG. 5 between the server 106 and the database 108. The server 106 may provide an inventory system which accesses inventory information stored in the database 108, for example. The server 106, or a function it supports, is thereby dependent upon, and thus has a "depends-on" relationship with, the database 108.

In one embodiment, relationships between assets may be represented in a two-stage manner. First, the relationship itself is represented in terms of its type, including "cabled-to", "runs-on", and "depends on" and the numbers of assets between which the particular relationship may exist. The "cabled-to" relationship in FIG. 5, for example, is of type "cabled-to", requires at least two endpoint assets. Security parameters, described in further detail below, may also be included in the specification of a relationship.

Once a relationship has been defined, the assets which are part of a particular relationship are linked to the relationship. For some types of relationship, the asset to relationship link may also indicate whether the asset is a "from" member or a "to" member of the relationship. The "from" and "to" information is used for relationships such as "runs-on", where the "from" member is the running member, and the "to" member is the member which the running member is being run on. In FIG. 5, the operating system 102 is the "from" member and the PC 101 is the "to" member of the relationship between the operating system 102 and the PC 101, as indicated by the direction of the arrow between these assets. For a "depends-on" relationship, the "from" member depends on the "to" member. For types of relationships having equivalent members, such as "cabled-to" relationships, the "from" or "to" value can be assigned "not applicable" or the like.

The present invention is not restricted to this type of representation of a relationship. The above representation is provided solely as an illustrative example.

Other types of assets and relationships may also exist in a communication network or other system for which risk is to be assessed. Examples of other types of relationship, and also the concept of associations between vulnerabilities and assets, are shown in FIGS. 6 and 7 and described in further detail below.

Figure 6:
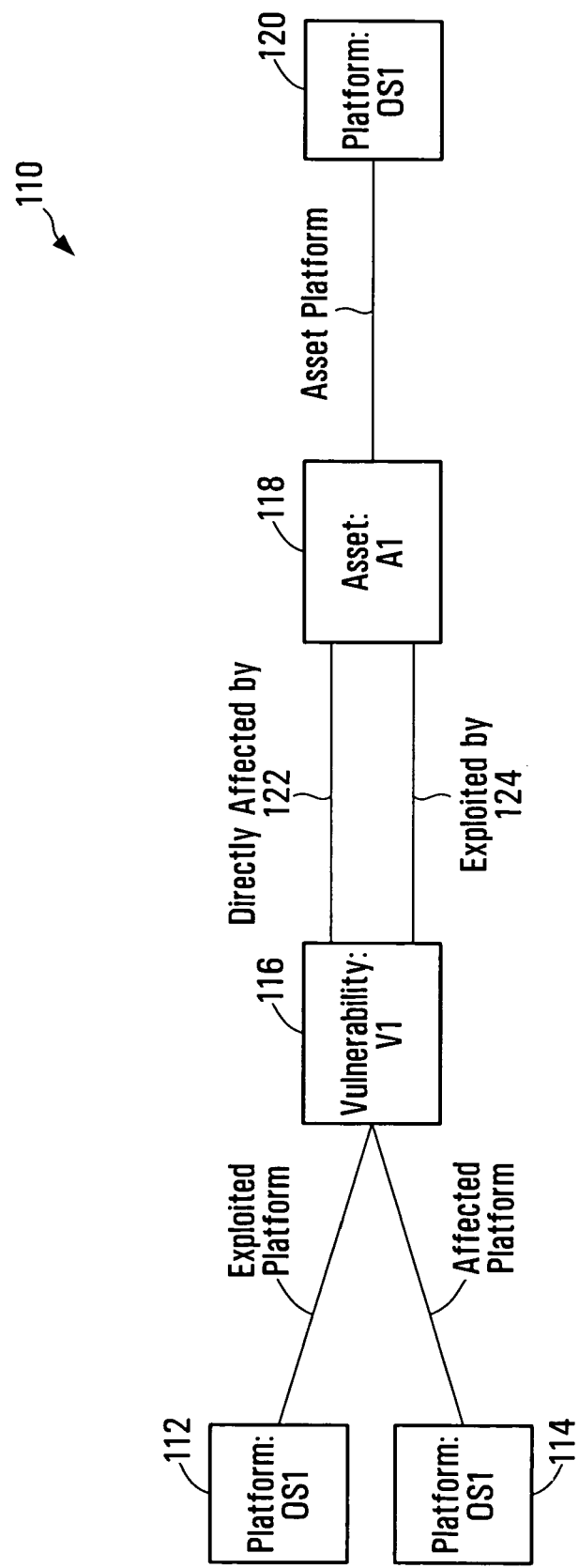
FIG. 6 is a block diagram illustrating a vulnerability, an asset, and associations therebetween.
Figure 7:
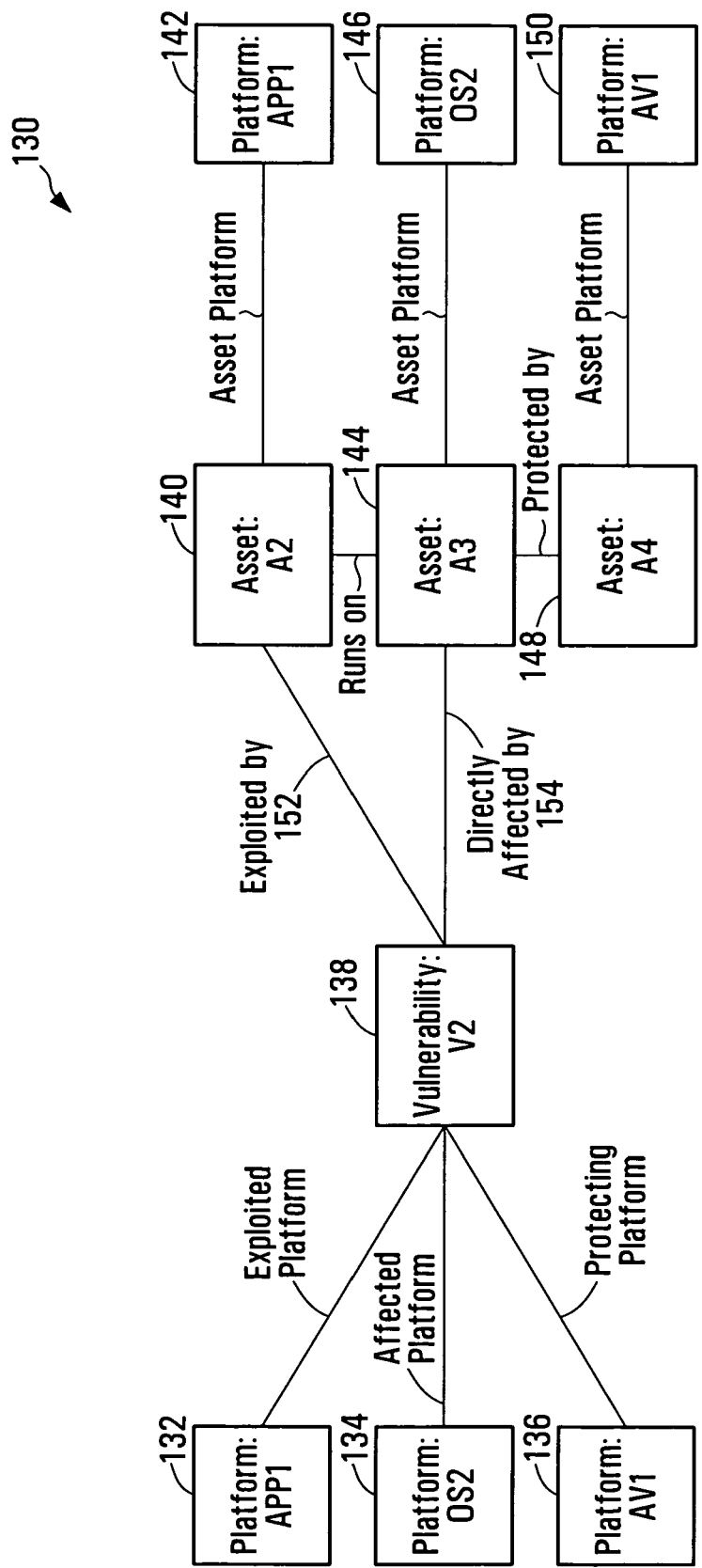
FIG. 7 is a block diagram illustrating vulnerabilities, assets, associations, and asset relationships.

FIG. 6 is a block diagram illustrating a vulnerability, an asset, and associations therebetween. In the example 110, a security vulnerability V1 and an asset A1 are shown at 116, 118. Information that may be included in a definition of the vulnerability V1 and the asset A1 are also shown at 112/114 and 120, respectively. Associations 122, 124 between the vulnerability V1 and the asset A1 may be made on the basis of a comparison of their respective definitions.

A definition of the vulnerability V1 includes multiple asset characteristics, in the form of an exploited platform 112 and an affected platform 114. The exploited platform 112 is a software platform that may be exploited via the vulnerability V1. In the event that the vulnerability V1 is actually used to exploit the exploited platform 112, there will be some effect on the affected platform 114. These platforms 112, 114, and also the asset platform 120 described below, may be specified in terms of a platform name and version for instance. In general, asset characteristics are identified according to an identification scheme that allows matching characteristics to be detected.

The exploited platform 112 and the affected platform 114 of the vulnerability V1 are the same. However, it should be appreciated that different platforms may be exploited and affected by a vulnerability. This is described in further detail below with reference to FIG. 7.

The definition of the asset A1 includes as an asset characteristic the asset platform 120. This asset platform 120 matches the exploited platform 112 of the vulnerability V1, and accordingly the vulnerability V1 and the asset A1 have a "exploited-by" association 124. The asset platform 120 also matches the affected platform 114, resulting in a further "directly affected-by" association 122. In one embodiment, a system compares the definition of the vulnerability V1 against the definitions of one or more assets, the asset A1 in FIG. 6, and specifically compares the asset platform 120 of the asset A1 against the exploited and affected platforms 112, 114 of the vulnerability V1. After detecting a match between the asset platform 120 of the asset A1 and both the exploited and affected platforms 112, 114 of the vulnerability V1, the system then associates the asset A1 and the vulnerability V1 with both an "exploited-by" association 124 and an "affected-by" association 122.

These associations might be created, for example, by modifying the definition of the vulnerability V1 and/or the definition of the asset A1, or by creating an association data structure in a memory, for example.

Definitions of assets and vulnerabilities may be obtained or derived from any of various sources. Information relating to vulnerabilities may be received in the form of vulnerability advisories, for example, and translated into vulnerability definitions having a suitable format and content. As described briefly above, a vulnerability advisory might specifically identify an exploited platform, but no distinction is normally made between exploited and affected platforms in such advisories. In accordance with an aspect of the invention, a vulnerability definition is compiled for each vulnerability, and specifies multiple asset characteristics, including one or more exploited platforms and one or more affected platforms. Although these definitions may include information provided in vulnerability advisories, existing advisories are not typically used in this manner, to identify different types of associations between vulnerabilities and assets.

FIG. 7 is a block diagram illustrating vulnerabilities, assets, associations, and asset relationships. In this more complex example 130, a vulnerability V2 shown at 138 exploits a flaw in the exploited platform, a software application (APP1) 132, to affect the affected platform, an operating system (OS2) 134. A protecting platform, antivirus software (AV1) 136 can be used to mitigate the vulnerability V2.

An asset A2 shown at 140 has a definition that includes the asset characteristic 142, also referred to herein as a platform specification, of APP1. The asset A2 has a "runs-on" relationship with another asset A3 as shown at 144, which has a platform specification 146 of OS2. Because the platform of the asset A2 is exploitable by the vulnerability V2, and the asset A2 has a runs-on relationship with the asset A3, whose platform matches the affected platform of the vulnerability V2, the asset A2 is considered to be exploited by the vulnerability V2, as shown at 152, while the asset A3 is considered to be affected by the vulnerability V2, as shown at 154. If, however, the platform specification 146 of the asset A3 were a platform other than OS2, then no associations between the asset A2, the asset A3, and the vulnerability V2 would be made. In this case, there would be no platform specification that matched the platform that the vulnerability V2 affects. Exploitation of the platform APP1 would then not affect the example system shown in FIG. 7.

During a subsequent risk evaluation or other process, when the affect of the vulnerability V2 on the asset A3 is being calculated, for example, the fact that the asset A3 has a "protected-by" relationship with another asset A4, as shown at 148, whose platform specification 150 matches the platform AV1 that mitigates the vulnerability V2, may be taken into account. This might result in the vulnerability V2 having no effect on the assets A2, A3. A protecting asset might also or instead cause the associations 152, 154 between the vulnerability V2 and the assets A2, A3 to be removed, although in some cases it may be useful to maintain those associations. For instance, associations such as 152, 154 may provide an operator with a more accurate view of vulnerabilities that exist in an information system, and how that system is protected from those vulnerabilities.

In the example 130 of FIG. 7, the protecting platform AV1 protects the affected platform OS2 against the vulnerability V1. It should be appreciated, however, that one or more protecting platforms may protect an exploited platform, an affected platform, or both.

Embodiments of the invention thus support different types of associations between vulnerabilities and assets. Currently available security risk management systems do not distinguish between exploited and affected platforms, and have no concept of a protecting platform. In those systems, an asset might be associated with a vulnerability by which it may be exploited, without regard to whether or not a platform that is actually affected by the vulnerability has been deployed in a managed system. Analysis of vulnerabilities in current systems also do not take into account protecting assets that guard against vulnerabilities.

Figure 8:
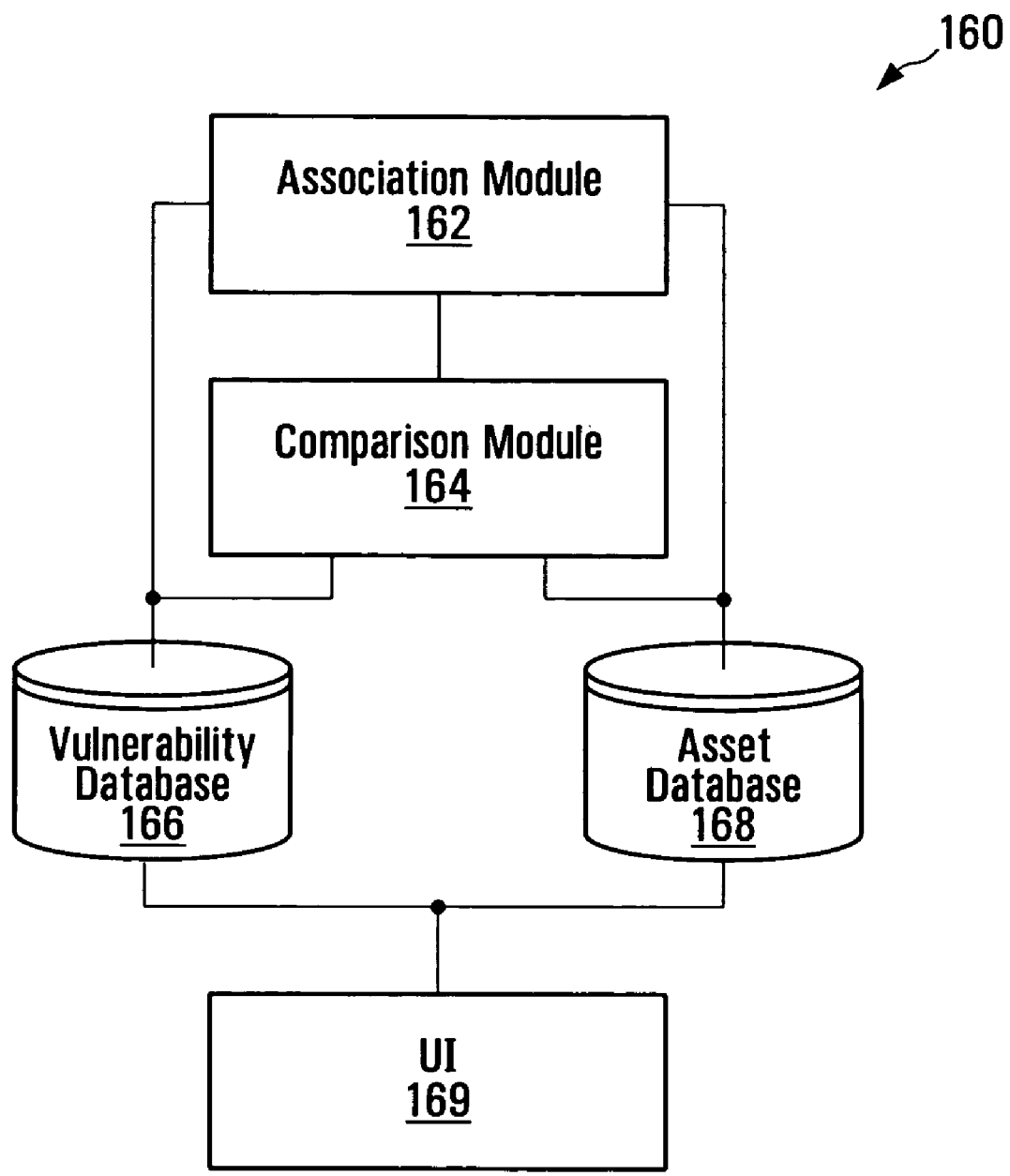
FIG. 8 is a block diagram of an apparatus for building associations between vulnerabilities and assets.

FIG. 8 is a block diagram of an apparatus for building associations between vulnerabilities and assets. The apparatus 160 includes an association module 162, a comparison module 164 operatively coupled to the association module 162, a vulnerability database 166 and an asset database 168 operatively coupled to the association module 162 and to the comparison module 164, and a user interface (UI) 169 operatively coupled to the vulnerability database 166 and to the asset database 168.

The present invention is in no way limited to the specific components and interconnections shown in FIG. 8. Other embodiments may include further, fewer, and/or different components interconnected in a similar or different manner than shown. For example, the apparatus 160 may also be operatively coupled to a risk analysis system. In some embodiments, the user interface 169 is operatively coupled to the association module 162 and/or to the comparison module 164 to allow a user to control the operation of those components. Other variations are also contemplated within the scope of the invention.

The components of the apparatus 160 may be operatively coupled to each other through physical connections or through logical interconnections where any of the components are implemented using software for execution by one or more processing elements.

It will thus be apparent that the components of the apparatus 160 may be implemented using hardware, software, firmware, or combinations thereof. Those skilled in the art will be familiar with devices that may be used in implementing the apparatus 160, including microprocessors, microcontrollers, Application Specific Integrated Circuits (ASICs), Programmable Logic Devices (PLDs), and/or Field Programmable Gate Arrays (FPGAs), for example.

In view of the many possible implementations of the components shown in FIG. 8, these components are described herein primarily in terms of their function. Based on these functional descriptions, a skilled person would be enabled to implement embodiments of the invention in any of various ways.

The vulnerability database 166 and the asset database 168, however, would generally be provided as data stores in a hardware component, specifically one or more memory devices. Solid state memory devices are common in some types of system, although the apparatus 160 may also or instead include memory devices for use with movable or even removable memory media.

The user interface 169 will also generally be provided using physical devices such as a keyboard, a mouse, and a display. A touchscreen is one example of a device which can both receive inputs from a user and provide outputs to a user.

The comparison module 164 is configured to compare a definition of a security vulnerability, from the vulnerability database 166, with a definition of each of one or more assets of an information system, from the asset database 168. As described above, the security vulnerability definition includes multiple asset characteristics, which may be in the form of exploited and affected platforms, for example.

As will be apparent from the foregoing, an asset is any hardware or software that has been installed in an information system such as a communication network. Each asset of an information system has a definition, stored in the asset database 168, that includes an asset characteristic, illustratively a platform specification that defines a name and version of the asset. For example, a software asset may have a platform specification of "application 1 version 1.2". Similarly, a hardware asset may have a platform specification "computer vendor 1 version 1c". In addition, each asset may have a set of interdependencies or relationships with other assets. An asset having a platform specification of "application 1 version 1.2" might have a "runs-on" relationship with another asset that has a platform specification of "operating system 1 upgrade 2". The other asset might also have a "runs-on" relationship with a further asset that has the platform specification of "computer vendor 1 version 1c".

A vulnerability definition includes several asset characteristics, which may also be in the form of platform specifications. These may include, possibly among others, asset characteristics that can be exploited via a vulnerability (e.g., one or more exploited platforms), asset characteristics that can be affected if the exploited platform is actually exploited (e.g., one or more affected platforms), and asset characteristics that can protect against or mitigate the effects of a vulnerability (e.g., one or more protecting platforms).

Asset characteristics specified in a vulnerability definition are compared with those in the definitions of each of one or more assets. To determine whether a vulnerability and an asset should be associated in a particular way, the platform specification of an asset may be compared with the appropriate platform specification of the vulnerability, for example. Results of such comparisons are provided to the association module 162 by the comparison module 164.

The association module 162 associates a security vulnerability and a particular asset if the definition of the asset includes a first asset characteristic specified in the security vulnerability definition, and either the definition of the asset or the definition of another asset that has a relationship with the asset includes a second asset characteristic specified in the security vulnerability definition. Vulnerability definitions, asset definitions, or both, may be modified by the association module 162 to create vulnerability/asset associations. A separate data store and/or data structures may also or instead be used to create associations.

The first asset characteristic may identify one of an exploited platform and an affected platform, in which case the second asset characteristic identifies the other of the exploited and affected platforms. Thus, the association module 162 associates an asset and a vulnerability if the definition of that asset, or the definition of that asset and the definition of another related asset, include the exploited platform and the affected platform. The association module 162 may also associate the security vulnerability with multiple assets where the exploited and affected platforms are different.

A protecting asset may also be identified by the apparatus 160. An exploited or affected asset may have a relationship with another asset whose definition specifies a third asset characteristic, illustratively a protecting platform, that is also specified in the definition of a vulnerability. The relationship between an exploited/affected asset and a protecting asset may be a "protected-by" relationship as shown in FIG. 7 or a "runs-on" relationship, where an exploited/affected platform and a protecting platform run on the same operating system for instance. Where a protecting platform is found by the comparison module 164, the association module 162 may also associate the security vulnerability and the protecting asset. In some embodiments, the association module 162 aborts the function of associating of the security vulnerability and one or more assets or removes any associations between the security vulnerability and one or more assets if a protecting platform exists in an information system. However, as noted above, it may be useful to establish or maintain these associations even when a protecting platform is found.

The UI 169 allows a user to access vulnerability and asset information in the databases 166, 168, to generate a view of any or all of assets, vulnerabilities, associations, and asset relationships in a Graphical User Interface (GUI), for example. It should be appreciated that the UI 169 might be a shared component that is also used for other purposes, such as in a security risk assessment system.

Figure 9:
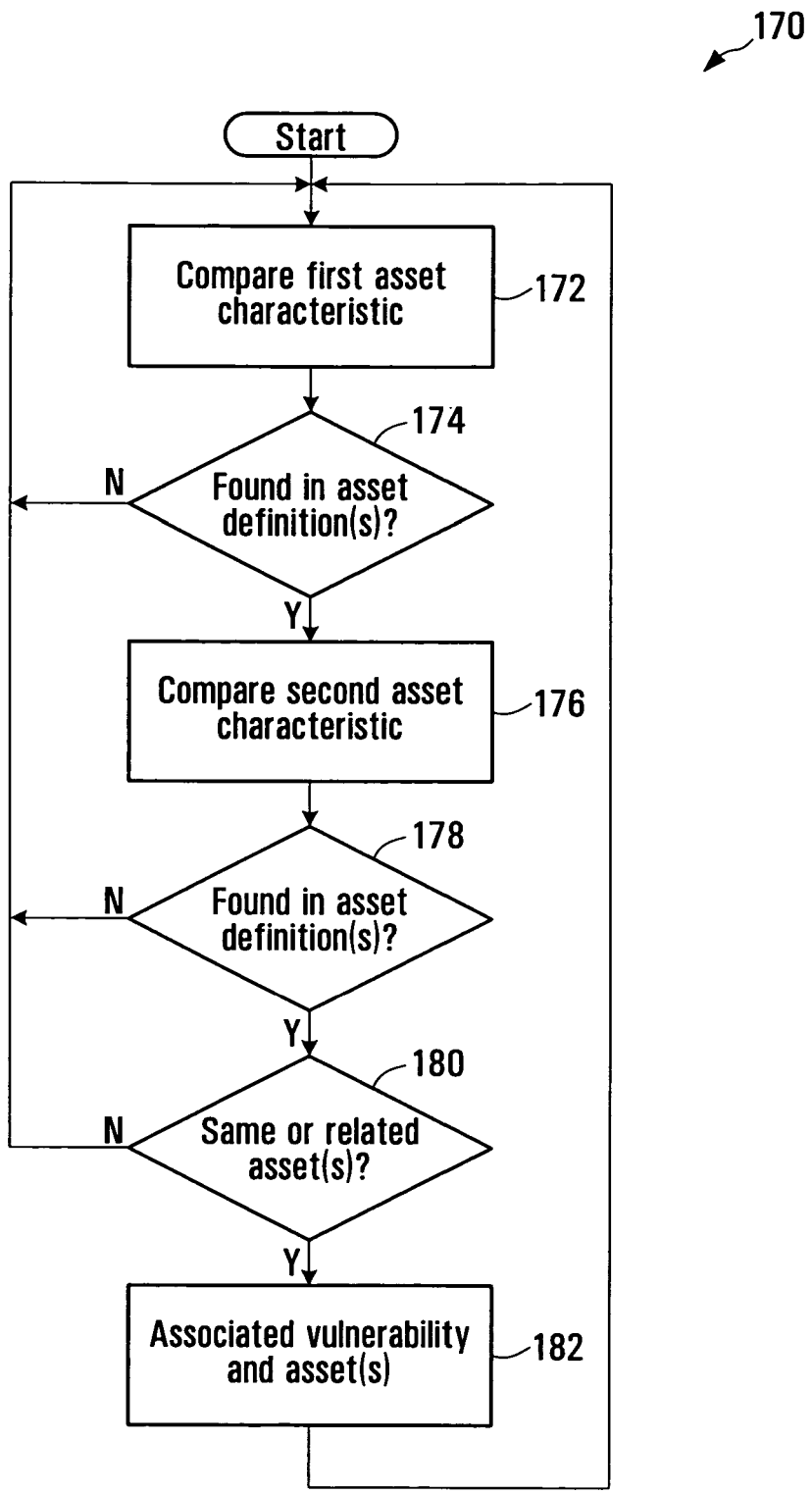
FIG. 9 is a flow diagram of a method of associating vulnerabilities with assets.

FIG. 9 is a flow diagram of a method of associating vulnerabilities with assets, and shows an example of a series of comparison functions that might be performed by the comparison module 164 (FIG. 8) in detail.

The method 170 begins at 172 with an operation of comparing a first asset characteristic specified in a security vulnerability definition with an asset characteristic specified in a definition of each of one or more assets. This may involve, for example, comparing the platform specification of each asset with the exploited platform associated with the vulnerability.

If the first asset characteristic specified in the security vulnerability does not match the asset characteristic in any of the asset definitions, as determined at 174, then no association is possible.

In the event that a matching first asset characteristic is found, then a further comparison is made at 176 to search for a second asset characteristic, illustratively by comparing the platform specification of the asset with the affected platform of the vulnerability.

If the second asset characteristic is found in the definition an asset (178), then a determination is made at 180 as to whether the second asset characteristic appears in the definition of the same asset as the first asset characteristic or in the definition of an asset that has a relationship with that first asset. In either of these cases, an association between the vulnerability and the asset is made at 182. Otherwise, no vulnerability to asset associations are necessary, since a platform that can be affected via the exploited platform has not been found.

The associating operation at 182 may involve creating one or more associations. Where an exploited platform and an affected platform are the same, for example, then one asset is considered to have both an "exploited-by" and a "directly affected-by" association with the vulnerability. When a vulnerability exploits and affects different asset characteristics, however, multiple associations may be created. For example, an asset whose platform matches an affected platform of the vulnerability and has a "runs-on" relationship with the asset whose platform specification matches the exploited platform of the vulnerability may be considered to have a "directly affected-by" association with the vulnerability.

The method 170 may be repeated for different vulnerabilities, when it is determined that no associations are to be made, or after one or more associations have been made at 182.

FIG. 9 represents an illustrative example of a method according to one embodiment of the invention. Other embodiments may include further, fewer, or different operations, performed in a similar or different order than explicitly shown.

For example, a method may include a selection operation to select particular assets to be considered when searching for the second asset characteristic. When an asset platform specification matches an exploited platform of a vulnerability for instance, only the exploited asset and those assets that have a "runs-on" relationship with the exploited asset might be considered when searching for a vulnerability's affected platform. Thus, a first group of assets might be considered in the comparison at 172, whereas a second group of assets might be considered at 176.

Another possible variation of the method 160 would involve comparing vulnerability and asset definitions to detect a further asset characteristic, illustratively a protecting platform. The existence of a protecting platform on an exploited or affected asset or an asset that has a "protected-by" or "runs-on" relationship with the exploited or affected asset may affect subsequent processing of vulnerabilities during risk calculations, in that the effects of a vulnerability can be negated by an appropriate protecting asset. When an asset is directly affected by a vulnerability, any other assets that have dependency on that asset, such as a "depends-on" or a "runs-on" relationship, may then be considered to have an "indirectly affected-by" association with the vulnerability. Assets that depend on indirectly affected assets may also have an "indirectly affected-by" association with the vulnerability, and so on, up to the top of any chain of dependencies. Either or both of direct and indirect effects of a vulnerability may be excluded from risk assessments if a protecting asset protects against a vulnerability.

It should be appreciated that although the method 170 has been described above primarily from the point of view of an exploited platform as the first asset characteristic and an affected platform as the second asset characteristic, a vulnerability/asset association procedure need not consider vulnerability platforms in this specific order. An operator may wish to determine whether a specific asset might be affected by any vulnerabilities. In this case, an asset platform might first be compared to affected platforms of vulnerabilities. If the asset platform matches an affected platform for a vulnerability, then a further comparison could be made to determine whether the exploited platform for that vulnerability matches the asset platform for that asset or an asset with which the asset has a "runs-on" relationship.

Additional operations that have not been explicitly shown in FIG. 9 but might be affected by vulnerability/asset associations include security risk assessment operations.

Other variations of the method 170 may be or become apparent to those skilled in the art.

By determining associations between vulnerabilities and assets, and relationships between assets, a security risk analysis system or method may propagate the effects of vulnerabilities between related assets.

The type of propagation between assets may be dependent upon the relationship between those assets. For example, a "depends-on" relationship between assets might indicate that one asset's availability depends on another asset's availability, but in the case of a "cabled-to" relationship, this might not be so. In the latter case, just because one asset is made unavailable does not necessarily mean that the other asset is unavailable. One example of this scenario would be two PCs connected to a network.

The risk analyzer 76 (FIG. 3), for example, may determine a vulnerability affecting an asset associated with a communication network, and propagate the effect(s) of the vulnerability from the asset to another asset which has a relationship with the asset. This propagation, and propagation in the reverse direction, may be applied between an asset and each other asset having a relationship with that asset.

A risk analyzer may also determine a security risk to the asset, and/or to the network, its services, and other network features, based on the vulnerabilities affecting the asset and the vulnerabilities propagated to the asset from the other assets.

Figure 10:
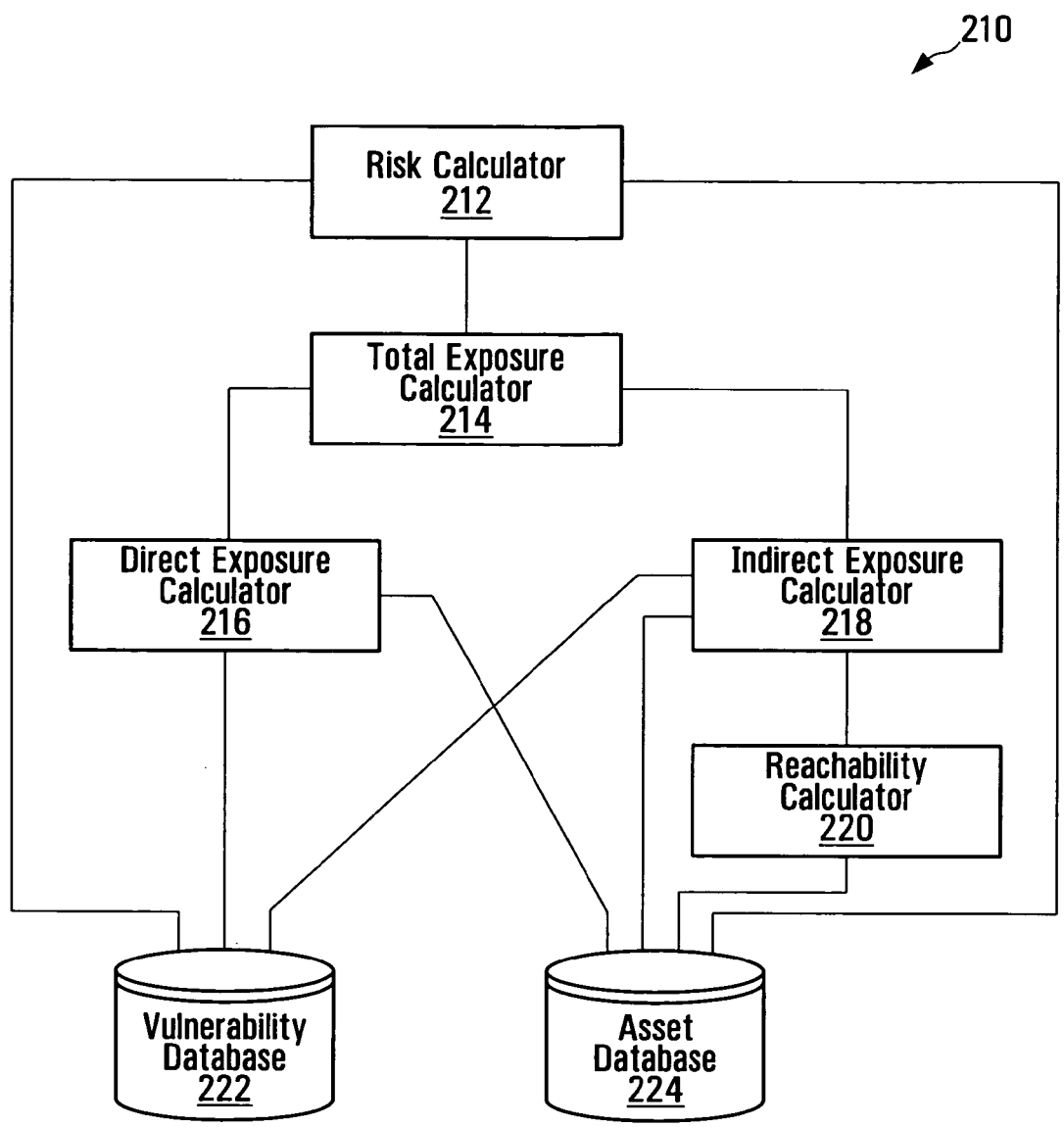
FIG. 10 is a block diagram of a risk calculation system.

FIG. 10 is a block diagram of a risk calculation system, which may be implemented in the risk analyzer 76 of FIG. 3, for example. The risk calculation system 210 includes a risk calculator 212, a total exposure calculator 214 operatively coupled to the risk calculator 212, a direct exposure calculator 216 operatively coupled to the total exposure calculator 214, a vulnerability database 222 operatively coupled to the risk calculator 212, to the direct exposure calculator 216, and to an indirect exposure calculator 218 which is also operatively coupled to the total exposure calculator 214, a reachability calculator 220 operatively coupled to the indirect exposure calculator 218, and an asset database 224 operatively coupled to the risk calculator 212, to the direct exposure calculator 216, to the indirect exposure calculator 218, and to the reachability calculator 220.

The calculators 212, 214, 216, 218, 220 may be implemented, for example, in software which is executed by a processor, although hardware-based embodiments and embodiments in which calculation functions are implemented using some combination of hardware and software are also contemplated.

The risk calculator 212 uses exposure and asset information to calculate a security risk to an asset, network service, or some other selected network feature. Exposure is a mapping between an given asset and the vulnerabilities which affect the asset. As noted above, a vulnerability is a condition in an asset's operation which makes it susceptible to an attack or failure. Other information, such as a threat value, may also be used by the risk calculator 212 in calculating risk. A threat value, which may be entered for an asset by a user for instance, is an indication that an asset may be harmed. For example, a PC which is not connected to a network and is in a highly guarded room might be tagged with a lower threat value than network-connected PCs even if there were several vulnerabilities in the software running on it.

An output of the risk calculator 212 is preferably multi-dimensional in nature. As network complexity increases with devices providing respective specific services, determined risk preferably reflects multiple facets of security, such as Confidentiality, Integrity, and Availability (C, I, A).

The security dimension(s) included in an output provided by the risk calculator 212 may be predetermined or configured by a user/owner through the configuration interface 64 (FIG. 3), for example. A user/owner might wish to evaluate security risk to a service which affects the service's availability. In this case, risk calculator 212 provides an output indicating the security risk to availability of the selected service.

Security dimension information may be provided in numeric format, as a number between 0 and 1 inclusive, indicating the level of importance or relevance of a security dimension to an asset, service, or other network feature. A triplet (1, 0, 0), for example, may be used to indicate a confidentiality risk, or as described below, that an asset has value for providing confidentiality in the network. It should be appreciated, however, that other indications may be used for security dimensions, such as indications of severity or importance of a risk, vulnerability, or asset with respect to each security dimension. The triplet (0.75, 0.50, 0.25), for instance, provides an indication that the C, I, A parameters have different levels of importance.

In the system 210, exposure may be calculated by the total exposure calculator 214 as a function of either or both of direct exposure and indirect exposure. Direct exposure is determined by the direct exposure calculator 216 based on vulnerabilities which directly affect an asset. The indirect exposure calculator 218 calculates a different type of exposure, indirect exposure, which propagates to an asset from related assets. For example, the effects of vulnerabilities associated with an operating system can propagate to any of its applications. In FIG. 5, the effects of vulnerabilities affecting the operating systems 102, 104 can propagate to the server 106 and the database 108, respectively. The indirect exposure calculator 118 uses information on relationships, assets, and reachability in its determination of indirect exposure to risks.

Reachability is determined by the reachability calculator 220 based on relationship and asset information. The reachability calculator 220 implements a function to calculate the exposure of a path between assets in the network. For example, the server 106 in FIG. 5 relies on physical connectivity between itself and the database 108 through the PC 101 and the workstation 103. The exposure to this connectivity is referred to herein primarily as "reachability".

The calculators in the system 210 may access the databases 212, 224 to obtain information on vulnerabilities and assets, and/or obtain information output from other calculators for use in further calculations, as in the case of the risk calculator 212 and the total exposure calculator 214. This set of calculators can be flexibly applied to risk calculations. Different user/owners or missions (business, government, military, and public for instance) may have different requirements or risk assessment scenarios.

The risk calculator 212, for example, which is operatively coupled to the direct and indirect exposure calculators 216, 218 through the total exposure calculator 214, may thus determine a security risk based on exposures determined by particular calculators selected for a current risk analysis operation. For example, a user might select a direct exposure analysis, in which case the direct exposure calculator 216 is selected.

Selection of calculators for a security risk analysis operation may be effected by explicitly selecting particular calculators or particular types of exposure to be analyzed, for instance, such as by entering risk analysis configuration information through a user interface. Calculator selection may also or instead be inherent in a type of risk analysis being performed. In one example, a network-wide risk assessment automatically causes all exposure calculators to be selected, whereas more targeted risk assessments may cause respective subsets of calculators to be selected. Other selection mechanisms are also contemplated, and may be apparent to those skilled in the art.

The effects of selection of a calculator may also be implementation-dependent. In some embodiments, a calculator is operative to calculate its corresponding type of exposure only if it is selected for a current risk analysis operation. Another possible implementation may have calculators which determine their corresponding types of exposure during every risk analysis operation, with another component, the total exposure calculator 214, for example, selecting one or more of the different types of exposure to include in total exposure calculations.

It should be appreciated that not every calculator need necessarily be selectable. A default or base calculator, illustratively the direct exposure calculator 216, might be always automatically selected and used in every risk analysis operation. In this case, the indirect exposure calculator 218 may be selectable to provide for flexibility in risk analysis.

Additional behavior-based components may also be combined with these calculators in a risk calculation system. A traversal agent or function, for example, may be used to determine the optimal order in which to process assets associated with a network during risk assessment.

According to one possible risk assessment scheme, each asset is processed sequentially with no regard for topology. In other schemes, assets might be processed in an order which is based on a more sophisticated algorithm which sequentially select assets based on, for example, asset relationships and asset paths, and/or attack paths. Risk propagation characteristics might also or instead be taken into account in determining a traversal order. A risk propagation characteristic could be used restrict risk propagation to a maximum of two relationships for instance. In this case, assets which are more than two relationships away from an asset will see no effect of risk to that asset. The particular traversal order algorithm used during an analysis operation may be predetermined, or selectable or otherwise configurable by a user.

Another possible behavioral component is an asset vulnerability builder, which builds associations between vulnerabilities and assets as described above. This component, with which the exposure calculators 216, 218 may interact to determine direct and indirect exposures, maps vulnerabilities to assets which they affect. The direct exposure calculator 216 calculates direct risk based on these mappings. Through relationships, the indirect exposure calculator 218 can determine which vulnerabilities, mapped to an asset by the asset vulnerability builder, propagate to other assets.

In some embodiments, the exposure calculators 216, 218 themselves map vulnerabilities to assets instead of using a separate asset vulnerability builder.

Asset to vulnerability mapping builds associations between assets of a network and known vulnerabilities, as described above. The asset and vulnerability databases 222, 224 store asset and vulnerability information which is accessed and processed to build these associations.

Asset relationships may be searched to determine whether each asset has a relationship with an asset that is directly affected by a vulnerability. An association may be made between the vulnerability and each asset that has a relationship with the directly affected asset. The depth and type of the relationship search may be user-specified, for example.

The above operations may be repeated for all vulnerabilities in the vulnerability database 222, and for all assets in the asset database 224.

Figure 11A:
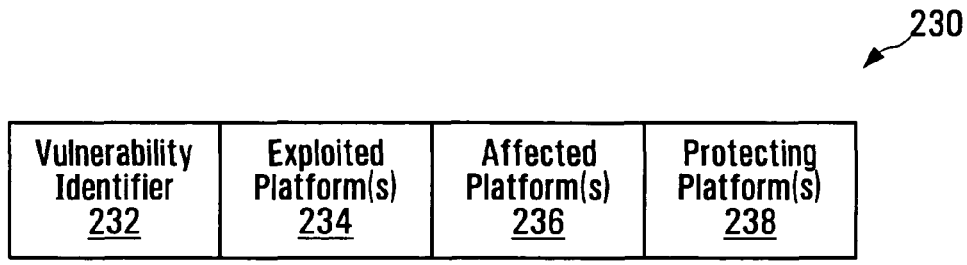
FIGS. 11A, 11B, and 11C are block diagrams of vulnerability, asset, and security state data structures, respectively.
Figure 11B:
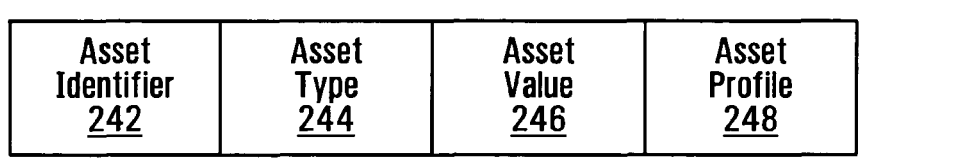

The process of determining vulnerabilities that affect an asset may be facilitated by particular data structures used to store vulnerability and asset data. FIGS. 11A and 11B are block diagrams of vulnerability and asset data structures, respectively. Vulnerability and asset databases may include multiple records having the structures shown in FIGS. 11A and 11B.

As shown in FIG. 11A, a vulnerability data structure 230 used to store vulnerability information in a vulnerability database may include a vulnerability identifier 232, an identifier 234 of each of one or more exploited platforms, an identifier 236 of each of one or more affected platforms, and an identifier 238 of each of one or more protecting platforms 238. The identifier 232 identifies a vulnerability by name, for example, and the platform identifiers 234, 236, 238 identify hardware or software platforms, which are examples of asset characteristics, by name and version number for instance.

A vulnerability data structure may include different information than explicitly shown in FIG. 11A. For example, a vulnerability description may provide further vulnerability information such as its effect, illustratively as a numeric triplet in terms of the above (C, I, A) security dimensions, conditions such as an access mechanism which are required for the vulnerability to be exploited, etc. This information might be specified, for example, according to Application Vulnerability Definition Language (AVDL), Common Vulnerabilities and Exposures (CVE), and/or Common Vulnerability Scoring System (CVSS). Further vulnerability information options are also possible, and may be or become apparent to those skilled in the art.

A vulnerability data structure might also include some form of indication of vulnerability/asset associations. An asset identifier and type of association(s) may be added to a vulnerability data structure, for instance, when an asset is identified as having an "exploited-by" and/or "affected-by" association with a vulnerability.

The asset data structure 240 of FIG. 11B includes an asset identifier 242, an asset type 244, an asset value 246, and an asset profile 248. The identifier 242 uniquely identifies the asset using a user-defined name for instance. The asset type field 244 may indicate the type of asset, as a physical or logical asset as described above, and/or provide more detail as to the nature of the asset, such as any service or mission to which the asset is critical or important. The asset value 246 indicates one or more values of the asset, such as a value in terms of (C, I, A) security dimension and/or a dollar value.

The asset profile 248 includes information used in mapping vulnerabilities to assets, collectively referred to herein as the asset definition. In the above example of an operating system vulnerability identified in the data structure 230 (FIG. 11A) by its name and version, the asset profile 248 of a PC may identify the name and version of the PC's operating system, and the vulnerability may thereby be mapped to the assets it exploits and affects by matching platform identifiers with asset profiles. Access mechanisms which are available for accessing an asset may also be indicated in the asset profile 248 for use in mapping vulnerabilities requiring particular access mechanisms to assets.

It should also be appreciated that assets and vulnerabilities may be matched in the opposite direction, in that information associated with an asset may be used to identify vulnerabilities which affect that asset.

Vulnerabilities and assets which are to be included in a risk assessment may similarly be identified by a risk analyzer by accessing information in the data structures 230, 240. With reference to FIG. 3, suppose a user/owner selects through the configuration interface 64 a confidentiality (C) risk assessment. In this case, the risk analyzer 76 accesses the databases 82, 84 to identify vulnerabilities which affect confidentiality and possibly assets which are valuable for maintaining confidentiality in the network.

Information regarding associations between vulnerabilities and assets and/or relationships between an asset and other assets may also be included in the asset profile 248, in the form of a type of association or relationship and a vulnerability identifier or an asset identifier for each association or relationship.

Associations or relationships may instead be indicated in separate data structures. Such a data structure might include an indication of a first type of association, illustratively an "exploited-by" association, between an asset and a vulnerability via which the asset may be exploited, and an indication of a second type of association, illustratively an "affected-by" association, either between the vulnerability and the asset, where the asset may be exploited via the security vulnerability to affect the asset, or between the security vulnerability and another asset, where the asset may be exploited via the security vulnerability to affect the other asset. An association data structure might also include an identifier of a vulnerability and an asset for each association type, and possibly additional vulnerability or asset information.

Figure 11C:
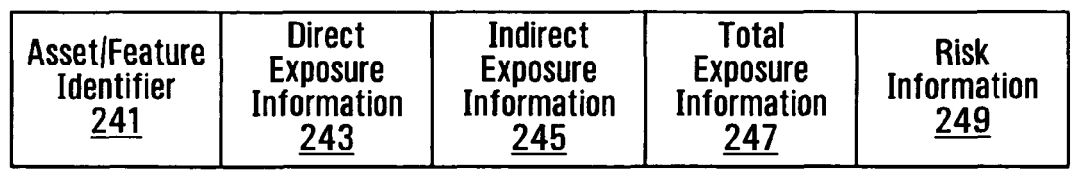

FIG. 11C is a block diagram of an illustrative example security state data structure 235. As shown, the security state data structure 235 includes an asset or feature identifier 241, and security state information including direct exposure information 243, indirect exposure information 245, total exposure information 247, and risk information 249.

The identifier 241 identifies an asset or feature of a communication network, in terms of a user-defined name for instance. The fields 243, 245, 247, 249 store security state information, preferably including exposure and risk values calculated by the calculators 212, 214, 216, 218 (FIG. 10). Any or all of these values may be expressed as values of the above (C, I, A) security dimensions.

It should be appreciated that the fields 243, 245, 247, 249 may also store other exposure or risk information, such as an identifier of another asset, a relationship type, and a propagated vulnerability in the case of the indirect exposure information 245, for example.

Other variations of the data structure 235 include providing multiple exposure fields for direct and indirect exposures of an asset or feature. A separate field might be provided for each vulnerability which directly or indirectly affects an asset, for example.

The data structure 235 may be used for storage of data in the security state database 86 (FIG. 3), for example. In another embodiment, exposure and risk information is added to asset records in an asset database, in which case any or all of the exposure and risk fields 243, 245, 247, 249 may be included in the asset data structure 240, possibly as part of the asset profile 248.

The data structures 230, 240, 235 are illustrative examples of data structures which may be used to store vulnerability, asset, and security state information. Different data structures, including additional or different information, may be used in other embodiments.

Figure 12:
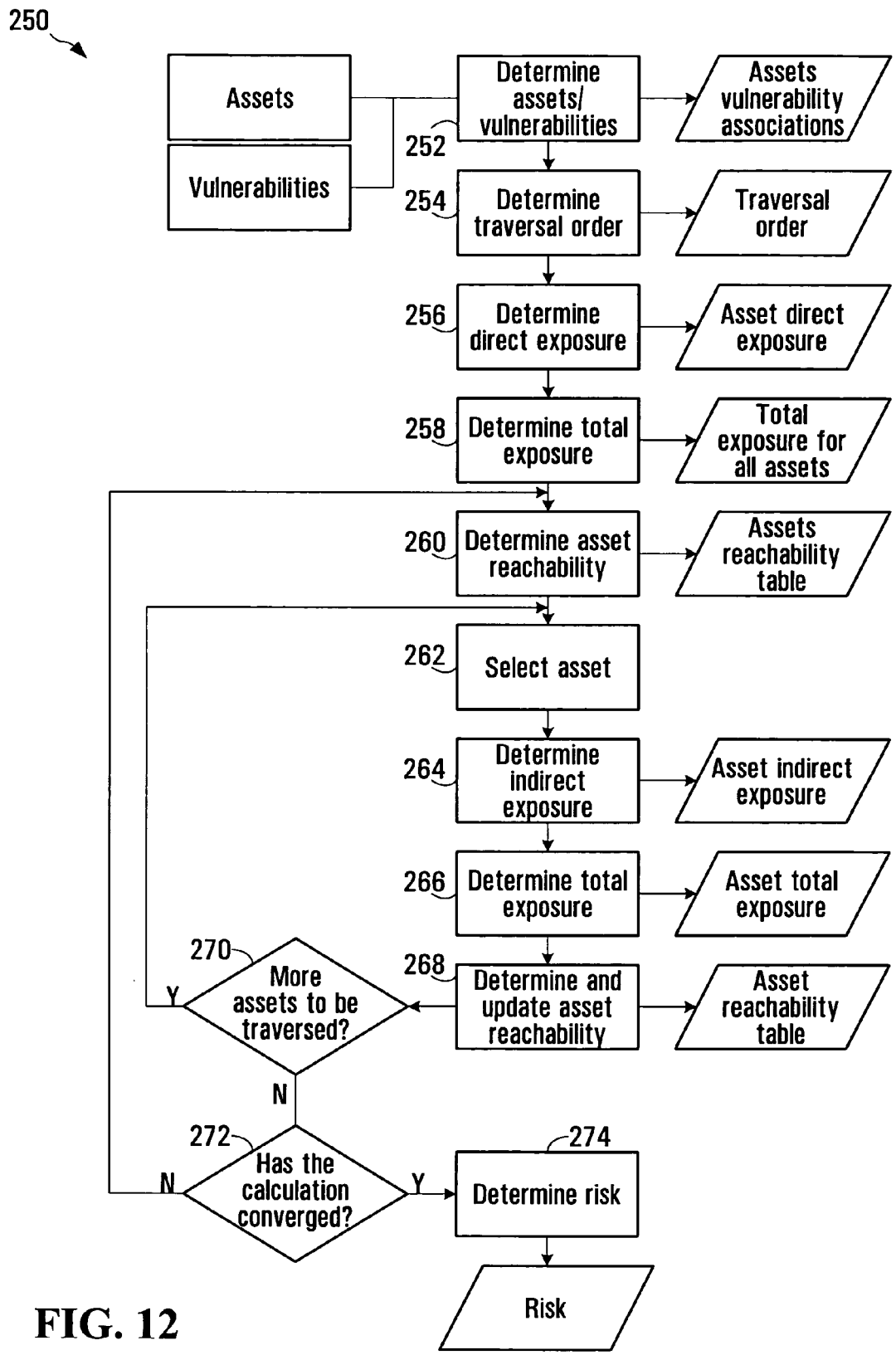
FIG. 12 is a flow diagram illustrating a risk calculation method.

FIG. 12 is a flow diagram illustrating a risk calculation method. In FIG. 12, operations in the method are labelled with reference numbers, and outputs of the various operations are shown adjacent to the labelled operation blocks. The operation of the calculators shown in FIG. 10 will also become apparent from FIG. 12 and the description thereof.

The method 250 begins at 252 with an operation of determining assets and vulnerabilities, by an asset vulnerability builder as described above for instance, to generate asset vulnerability associations. This determination may involve simply retrieving stored asset and vulnerability information, or in some embodiments processing information to calculate asset and vulnerability information, which is then compared to map or associate assets and vulnerabilities.

At 254, the traversal order for processing assets is determined. Direct exposures of the assets, in the traversal order, are then determined at 256 using the asset/vulnerability associations.

Direct exposure may be determined at 254 in (C, I, A) terms. In this case, each vulnerability has a (C, I, A) value which represents the effect that the vulnerability would have on an asset. A rule set is used in some implementations to determine how final direct exposure values are calculated. For example, direct exposure for an asset could be generated using the sum of the (C, I, A) values of all of the vulnerabilities which directly affect, as indicated in the asset vulnerability associations determined at 252. Other possible direct exposure calculation rules may specify that a maximum value of the vulnerabilities or a maximum value of each security dimension is to be chosen as a final direct exposure value. The rule or rules used for direct exposure calculation may be predetermined or user-selected.

It should be appreciated that further options are also possible for determining final direct exposures. For example, a direct exposure calculator may take additional information into account, such as a user-entered or otherwise provided indication of attacker expertise.

Total exposure is determined at 258, although in this case only direct exposure has been determined at 256 and thus total exposure is the same as the direct exposure.

The operations at 252 through 258 may initialize software-based calculators and data, specifically direct and total exposure for all assets, to be used in subsequent risk analysis. However, it should be appreciated that a user/owner may configure a risk analysis system such that only direct vulnerabilities are analyzed. In this case, direct exposure may be determined at 256 for all assets, or for only certain assets which are associated with a particular service, mission, and/or security dimension. The determination of total exposure at 258 may still be performed in this case, even though total exposure would be the same as direct exposure. This may important, for example, in a software-based system in which a risk calculator is configured to determine a security risk based on a total exposure variable.

The method 250 then transitions into an indirect exposure phase, if risk analysis is to take indirect exposures into account, and continues at 260 with an operation of determining reachability for assets.

As described above, assets may have relationships such as "depends-on" relationships between them. For example, a web server A might depend on a database server B. In this case, A's functionality relies on B functioning correctly and being reachable through the network. To determine reachability, other assets in the network, as well as "cabled-to" and "runs-on" relationships between A and B, are taken into account.

The exposure of the path between these assets is determined, illustratively using some form of a Dijkstra algorithm or an algorithm based on Open Shortest Path First (OSPF), and exposures for each of the assets in the path between two endpoint assets. The output of this algorithm is a reachability value, shown in FIG. 12 as a reachability table which contains that total exposure for each connected pair of assets.

An asset is selected at 262, in the traversal order determined at 254 or possibly in a different order, and its indirect exposure is determined at 264 based on its reachability and relationships.

Indirect exposure represents exposure of an asset to risks or vulnerabilities of other assets through its relationships. The determination of indirect exposure may involve traversing an entire list of relationships associated with the asset and evaluating whether each of those relationships have been fulfilled, that is, associated with one or more other assets.

When one asset depends on another, it also implies that the depended-on asset is reachable through the network. A risk to the reachability of each asset may thus be factored into the indirect exposure calculation.

A rule set may be used to determine the how indirect exposure values are calculated based on asset types and relationships. For example, an operating system asset might treat a "depends-on" relationship differently than a router asset would.

For each relationship evaluation, there may be several attributes to take into account, including the types of the assets at the endpoints of the relationship, the direct exposure values of those assets, a scaling factor associated with the relationship, and the exposure value for the path between those assets.

The reachability exposure of the endpoints of the relationship may be evaluated using the reachability table described above. This represents the exposure value for the path between the assets.

Using the parameters contained in the indirect exposure rule set, an evaluation of the exposure from each relationship is calculated. For example, the path exposure and the endpoint exposure could be combined and then multiplied by the relationship scaling factor to determine the indirect exposure for a single relationship. These operations are repeated for each relationship associated with the asset.

Once all relationship exposures have been determined, indirect exposure is determined based on the relationship exposures. For example, the relationship exposures could be summed, or a maximum relationship exposure or maximum of each security dimension could be selected, to determine the final indirect exposure. Other algorithms may also or instead be used to determine indirect exposure.

Total exposure for the asset, including its direct exposure as determined at 254, and its indirect exposure as determined at 264, is determined at 266. As for the direct and indirect exposures described above, a rule set may be used to define how total exposure is determined. For example, a rule set might specify that 75% of total exposure is to come from direct exposure and 25% is to come from indirect exposure. Total exposure calculation might also or instead vary depending on the type of asset to which it is being applied, to provide different total exposure calculation schemes for an operating system and a hardware platform for instance.

As the total exposure of other assets with relationships to an asset may affect its reachability, the reachability of the asset may again be determined at 268 to update the asset reachability table. For example, a PC which connects to a network through a router may have a high exposure to the router's availability. Thus, the PC could be less reachable depending on the total exposure of the router.

As shown at 270, the operations at 262 through 268 are repeated for all assets to be analyzed. This may include all assets when a comprehensive network analysis is being performed, or only certain assets when a more targeted analysis, for particular assets or groups of assets or a particular service, mission, or security dimension for instance, is being conducted.

Steps 260-268 may be iterated until either exposure calculations converge, as shown at 272, or some predetermined number of iterations have been completed.

An estimate of security risk is then determined at 274 using the total exposure and an indication of security risk is provided.

Risk calculation, like exposure calculation, may be controlled by a rule set. A relatively simple risk calculator might implement a multiplication rule in which exposure and asset values are multiplied. Where (C, I, A) values are used, this type of scheme effectively accounts for differences in asset and exposure security parameters. For example, an exposure value of (1, 0, 0) generates a risk value of (1, 0, 0) only if the asset value also has a confidentiality parameter of 1. Thus, a confidentiality exposure results in a confidentiality risk only if an asset has value for the purposes of confidentiality. A confidentiality exposure would not result in any risk to an asset which has value only for integrity and/or availability.

A determination of risk may also involve processing further information, such as a user-entered threat value. In the case of a "multiply" risk calculation rule, a threat value might scale the product of exposure and asset values.

Figure 13:
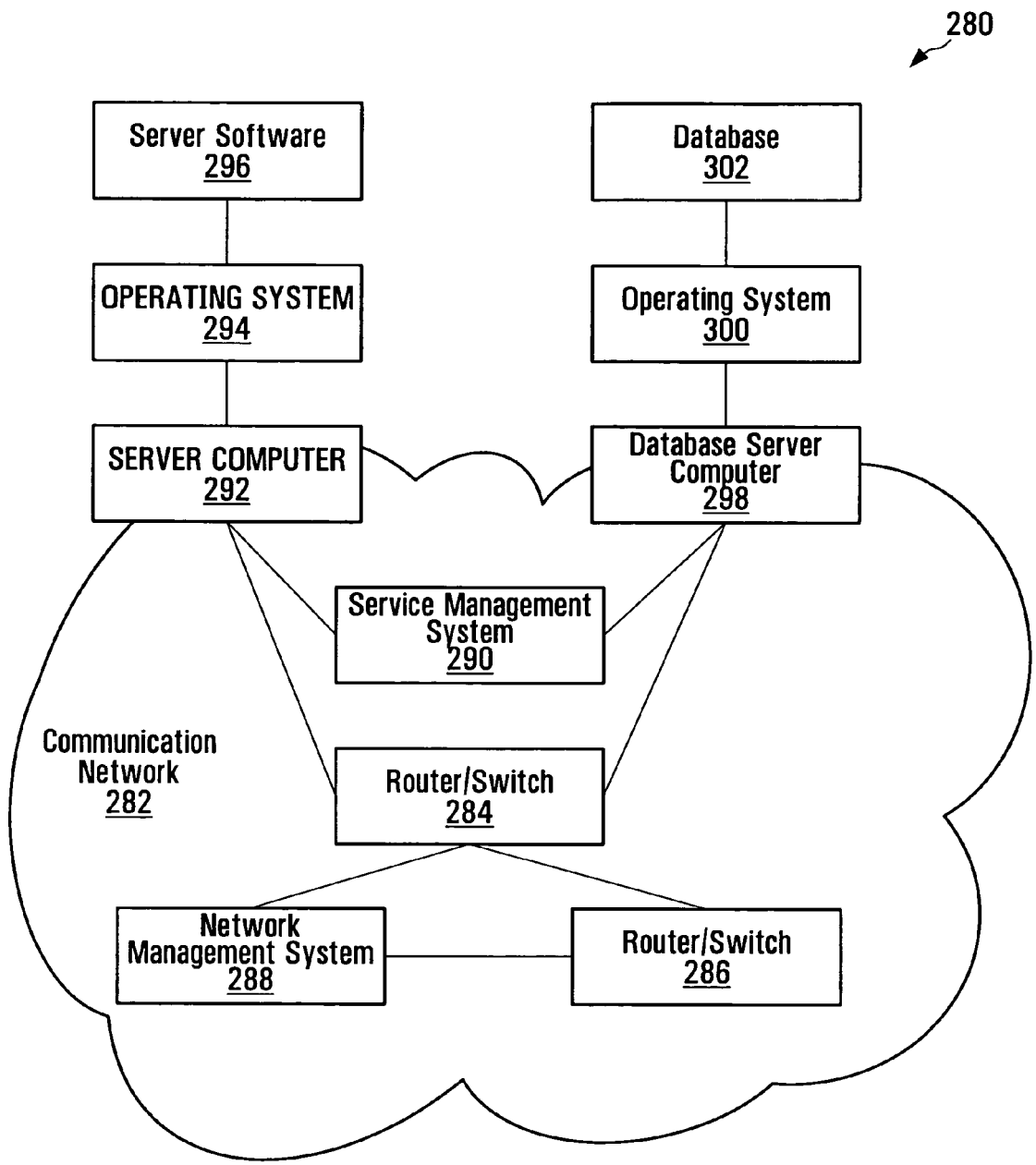
FIG. 13 is a block diagram of an information system in conjunction with which embodiments of the invention may be implemented.

FIG. 13 is a block diagram of an information system 280 in conjunction with which embodiments of the invention may be implemented. The communication network 282 in FIG. 13 includes routers/switches 284, 286 through which communication links may be established, a network management system 288 for managing the router/switch modules 284, 286, a server computer 292 and a database server computer 298 which communicate through the router/switch 284, and a service management system 290 which manages a service provided by the server computer 292 and the database server computer 298.

The server computer 292 and the database server computer 298 are examples of the PC and workstation shown in FIG. 5. These computers, along with their operating systems 294, 300 and server and database application software 296, 302, cooperate to provide a database access service such as an inventory service.

The types of equipment which might be implemented as the routers/switches 284, 286, the server computers 292, 298, and the management systems 288, 290, as well as other equipment which may be provided in the communication network 282, will be apparent to those skilled in the art. The present invention is in no way restricted to any specific types of equipment or other communication network assets. Although not explicitly shown in FIG. 13, other assets associated with the communication network 282, including buildings in which communication equipment or other assets are housed, may also be included in a communication network risk analysis model.

The security risk assessment techniques as disclosed herein would be useful in the network management system 288 for assessing risks to assets in the communication network 282. The service management system 290 is an example of another type of system in which these techniques may be useful, to manage risks to the server computers 292, 298 and other assets which are involved in providing a service.

A risk analyzer could be implemented as an extension to existing network and service management systems to provide current security status information of a network and/or service. Considering a telecommunications service provider for instance, a risk analyzer would complement an Operation Support System (OSS) and could be integrated in a Security Operation Center (SOC) next to a Network Operation Center (NOC). For OSS software vendors, the risk analysis and management techniques disclosed herein offer an opportunity to provide a specific security extension which could be offered as a customization added component.

Embodiments of the invention provide techniques for describing and modelling complex associations that may exist between vulnerabilities and assets that are exploited, affected, and protected.

By making a distinction between assets that a vulnerability exploits and assets it affects (directly and indirectly), a user can see the ultimate end result of the overall effect of a vulnerability, which may be far removed from the asset being exploited. Further, a user can follow the chain of dependencies to find the asset that a vulnerability may actually exploit, which is the asset that could be modified (e.g., patched) to prevent exploits based on the vulnerability.

Solutions that only associate vulnerabilities with the assets they can exploit do not allow the user to measure and observe the effects (direct and indirect) of the vulnerabilities. Systems that do not model how an asset can be protected by another asset can also result in "false positive" indications of risks that are not actually present in an information system. This wastes the time and resources of users that might be better spent addressing risks that are actually present in the network.

What has been described is merely illustrative of the application of principles of the invention. Other arrangements and methods can be implemented by those skilled in the art without departing from the scope of the present invention.

Although described primarily in the context of methods, systems, and data structures, other implementations of the invention are also contemplated, illustratively as instructions stored on a machine-readable medium, for example.

A GUI might also embody aspects of the present invention. As noted above, an accurate view of vulnerabilities and resultant risks that may actually exist in an information system can provide significant advantages in terms of identifying root sources of risks, how the underlying vulnerabilities might be mitigated, and existing assets that are protecting against certain vulnerabilities.

Thus, a GUI that is presented to a user on a display device might include a representation of a vulnerability via which an asset of an information system may be exploited and a representation of the asset. A representation a first type of association between the vulnerability and the asset, such as an "exploited-by" association, is also provided.

As described above, a distinction may be made between different types of vulnerability/asset associations. A GUI may therefore include a representation of a second type of association, illustratively an "affected-by" association, either between the vulnerability and the asset, such as where the asset may be exploited via the vulnerability to affect the asset itself, or between the vulnerability and another asset that has a relationship with the asset, where the asset may be exploited via the vulnerability to affect the other asset. In the latter case, the GUI may also include a representation of the relationship between the asset and the other asset.

If the exploited asset and/or the affected asset is protected from the vulnerability by one or more protecting assets, then the GUI might include a representation of the protecting asset(s) and a representation of the relationship between the asset and the other asset. An association between the vulnerability and the protecting asset may also be represented.

In one embodiment, vulnerabilities and assets are represented using icons, and associations and relationships are represented in the form of links between icons. A GUI may thus appear substantially as shown in FIG. 6 or FIG. 7.

It should also be appreciated that an asset definition might include multiple asset characteristics or platform specifications, depending upon the granularity of an asset model. A computer system, for example, might be modelled using a single asset definition including a hardware platform specification, an operating system platform specification, and an application software platform specification. The same computer system could be modelled using multiple definitions, such as one definition for the computer system hardware, one definition for the operating system software, and another definition for the application software. References herein to asset definitions should be interpreted accordingly.

We claim:

1. An apparatus comprising:
a memory storing respective definitions of assets of an information system, relationships between the assets, and definitions of security vulnerabilities;
a comparison module operatively coupled to the memory and configured for comparing the definition of a security vulnerability with the respective definitions of the assets, the security vulnerability definition identifying an exploited asset platform that may be exploited via the security vulnerability, an affected asset platform that is affected when the exploited asset platform is exploited via the security vulnerability, and a protecting asset platform that protects the exploited asset platform or the affected asset platform against the security vulnerability, the comparison module being further configured for determining whether (i) the definition of a particular asset identifies the exploited asset platform, (ii) the definition of another asset that has a relationship with the particular asset identifies the affected asset platform, (iii) the definition of a further asset identifies the protecting asset platform, and (iv) the further asset has a relationship with the one of the particular asset and the other asset whose definition identifies the exploited asset platform or the affected asset platform that is protected by the protecting asset platform; and
an association module, operatively coupled to the comparison module and to the memory, configured for associating the security vulnerability and the particular asset where (i) the definition of the particular asset identifies the exploited asset platform and (ii) the definition of the other asset identifies the affected asset platform, the association module being further configured for creating a further association between the security vulnerability and the further asset where (iii) the definition of the further asset identifies the protecting asset platform, and (iv) the further asset has a relationship with the one of the particular asset and the other asset whose definition identifies the exploited asset platform or the affected asset platform that is protected by the protecting asset platform.

2. The apparatus of claim 1, wherein the association module is further configured for creating a further association between the security vulnerability and the other asset where (i) the definition of the particular asset identifies the exploited asset platform and (ii) the definition of the other asset identifies the affected asset platform.

3. The apparatus of claim 1, wherein the association module is configured for associating the security vulnerability and the particular asset by modifying at least one of: the security vulnerability definition and the definition of the particular asset.

4. The apparatus of claim 1, wherein the association module is configured for associating the security vulnerability and the particular asset by accessing a memory to create a logical association between the security vulnerability and the particular asset.

5. The apparatus of claim 1, wherein the association module is further configured for performing, where the further association is to be created, an operation selected from the group consisting of: aborting the associating of the security vulnerability and the particular asset, and removing an association between the security vulnerability and the particular asset.

6. The apparatus of claim 1, wherein the comparison module is configured for comparing the exploited asset platform to a definition of each asset in a first group of the assets, and for comparing the affected asset platform to a definition of each asset in a second group of the assets where the definition of at least one asset in the first group identifies the exploited asset platform.

7. The apparatus of claim 6, wherein the second group comprises the at least one asset and each asset having a relationship with the at least one asset.

8. A method comprising:
a comparison module comparing a definition of a security vulnerability with respective definitions of assets of an information system stored in a memory, the memory further storing relationships between the assets, the security vulnerability definition identifying an exploited asset platform that may be exploited via the security vulnerability, an affected asset platform that is affected when the exploited asset platform is exploited via the security vulnerability, and a protecting asset platform that protects the exploited asset platform or the affected asset platform against the security vulnerability;

the comparison module determining whether (i) the definition of a particular asset identifies the exploited asset platform, (ii) the definition of another asset that has a relationship with the particular asset identifies the affected asset platform, (iii) the definition of a further asset identifies the protecting asset platform, and (iv) the further asset has a relationship with the one of the particular asset and the other asset whose definition identifies the exploited asset platform or the affected asset platform that is protected by the protecting asset platform;

an association module associating the security vulnerability and the particular asset where (i) the definition of the particular asset identifies the exploited asset platform and (ii) the definition of the other asset identifies the affected asset platform; and the association module creating a further association between the security vulnerability and the further asset where (iii) the definition of the further asset identifies the protecting asset platform, and (iv) the further asset has a relationship with the one of the particular asset and the other asset whose definition identifies the exploited asset platform or the affected asset platform that is protected by the protecting asset platform, wherein at least one of the comparison module and the association module is implemented using hardware.

9. The method of claim 8, further comprising:
the association module creating a further association between the security vulnerability and the other asset where (i) the definition of the particular asset identifies the exploited asset platform and the definition of the other asset identifies the affected asset platform.

10. The method of claim 8, wherein associating comprises accessing a memory to create a logical association between the security vulnerability and the particular asset.

11. A non-transitory machine-readable medium storing instructions which when executed perform the method of claim 8.

12. An apparatus comprising:
a memory storing respective definitions of assets of an information system, relationships between the assets, and definitions of security vulnerabilities;
a comparison module operatively coupled to the memory and configured for comparing the definition of a security vulnerability with the respective definitions of the assets, the security vulnerability definition identifying an exploited asset platform that may be exploited via the security vulnerability, an affected asset platform that is affected when the exploited asset platform is exploited via the security vulnerability, and a protecting asset platform that protects the exploited asset platform or the affected asset platform against the security vulnerability, the comparison module being further configured for determining whether (i) the definition of a particular asset identifies the exploited asset platform, (ii) the definition of another asset that has a relationship with the particular asset identifies the affected asset platform, (iii) the definition of a further asset identifies the protecting asset platform, and (iv) the further asset has a relationship with the one of the particular asset and the other asset whose definition identifies the exploited asset platform or the affected asset platform that is protected by the protecting asset platform;

an association module, operatively coupled to the comparison module and to the memory, configured for associating the security vulnerability and the particular asset where (i) the definition of the particular asset identifies the exploited asset platform and (ii) the definition of the other asset identifies the affected asset platform, the association module being further configured for creating a further association between the security vulnerability and the further asset where (iii) the definition of the further asset identifies the protecting asset platform, and (iv) the further asset has a relationship with the one of the particular asset and the other asset whose definition identifies the exploited asset platform or the affected asset platform that is protected by the protecting asset platform; and a display, operatively coupled to the comparison module and to the association module, configured for providing:
a representation of the security vulnerability;
a representation of the particular asset;
a representation of the other asset;
a first type of representation of the association between the security vulnerability and the particular asset;
a second type of representation of the further association between the security vulnerability and the other asset;
a representation of the further asset; and
a representation of the relationship between the particular asset and the further asset.

13. The apparatus of claim 12, wherein the display is further configured for providing:
a representation of the relationship between the particular asset and the other asset.

* * * * *